US012589449B2

(12) United States Patent
Nakayama et al.

(10) Patent No.: US 12,589,449 B2
(45) Date of Patent: Mar. 31, 2026

(54) LASER WORKING MACHINE AND METHOD FOR MAINTAINING LASER WORKING MACHINE

(71) Applicant: Yamazaki Mazak Corporation, Niwa-gun (JP)

(72) Inventors: Tomohisa Nakayama, Niwa-gun (JP); Satoshi Sasaki, Niwa-gun (JP); Tetsuichi Kitamoto, Niwa-gun (JP)

(73) Assignee: YAMAZAKI MAZAK CORPORATION, Niwa-gun (JP)

( * ) Notice: Subject to any disclaimer, the term of this patent is extended or adjusted under 35 U.S.C. 154(b) by 1041 days.

(21) Appl. No.: 17/577,332

(22) Filed: Jan. 17, 2022

(65) Prior Publication Data

US 2022/0134482 A1 May 5, 2022

Related U.S. Application Data

(63) Continuation of application No. PCT/JP2019/028558, filed on Jul. 19, 2019.

(51) Int. Cl.
B23K 26/70 (2014.01)
B23K 7/10 (2006.01)
(Continued)

(52) U.S. Cl.
CPC .............. B23K 26/702 (2015.10); B23K 7/10 (2013.01); B23K 26/064 (2015.10); B23K 26/128 (2013.01); G02B 17/06 (2013.01)

(58) Field of Classification Search
CPC .. B23K 26/702; B23K 26/082; B23K 26/352; B23K 2103/38; B23K 26/06;
(Continued)

(56) References Cited

U.S. PATENT DOCUMENTS 5,938,953 A * 8/1999 Jurca .................... B23K 26/032
219/121.63
6,353,203 B1 * 3/2002 Hokodate ............ B23K 26/032
219/121.75
(Continued)

FOREIGN PATENT DOCUMENTS

CN 1657221 8/2005
CN 103140319 6/2013
(Continued)

OTHER PUBLICATIONS

Chinese Office Action for corresponding CN Application No. 201980095402.5, Mar. 9, 2022.
(Continued)

*Primary Examiner* — Chris Q Liu
(74) *Attorney, Agent, or Firm* — MORI & WARD, LLP

(57) ABSTRACT

A laser working machine includes a first slot provided at another end portion of a first body. In the first slot, either one of a first shielding plate and a first light transmissive plate is selectively insertable in a sealed manner. The first shielding plate is configured to block a first optical path. The first light transmissive plate has a first optical path hole through which the first optical path and a second optical path are connectable. The laser working machine includes a second slot provided at a second body end portion of a second body. In the second slot, either one of a second shielding plate and a second light transmissive plate is selectively insertable in a sealed manner. The second shielding plate is configured to block the second optical path. The second light transmissive plate has a second optical path hole.

20 Claims, 26 Drawing Sheets

(51) Int. Cl.
　　B23K 26/064　　　(2014.01)
　　B23K 26/12　　　　(2014.01)
　　G02B 17/06　　　　(2006.01)

(58) Field of Classification Search
　　CPC .............. B23K 26/064; B23K 26/0869; B23K
　　　　　　26/0884; B23K 26/0892; B23K 26/128;
　　　　　　　　B23K 26/38; B23K 26/402; B23K
　　　　　　　　　　　　37/0235; B23K 7/10
　　USPC ....................................... 219/121.74, 121.78
　　See application file for complete search history.

(56)　　　　　　References Cited

U.S. PATENT DOCUMENTS

| | | | | |
|---|---|---|---|---|
| 7,671,296 | B2 * | 3/2010 | Antoine | ............. B23K 26/0643 |
| | | | | 219/121.7 |
| 2002/0148819 | A1 * | 10/2002 | Maruyama | ........... B23K 26/082 |
| | | | | 219/121.78 |
| 2004/0182842 | A1 * | 9/2004 | Denney | .............. B23K 26/0622 |
| | | | | 219/121.84 |
| 2005/0178753 | A1 * | 8/2005 | Yamazaki | .......... B23K 26/0884 |
| | | | | 219/121.74 |
| 2012/0241423 | A1 * | 9/2012 | Yokoi | ................ B23K 37/0235 |
| | | | | 219/121.62 |
| 2013/0182727 | A1 | 7/2013 | Matsumoto et al. | |

| | | | | |
|---|---|---|---|---|
| 2017/0297144 | A1 * | 10/2017 | Nakanishi | .............. H04N 23/56 |
| 2018/0169787 | A1 * | 6/2018 | Murkin | .............. B23K 26/1482 |
| 2018/0326494 | A1 * | 11/2018 | Uemura | ................. B22F 10/50 |

FOREIGN PATENT DOCUMENTS

| | | |
|---|---|---|
| CN | 107398642 | 11/2017 |
| CN | 208005008 U | 10/2018 |
| JP | 5-192783 | 8/1993 |
| JP | 2005-271051 | 10/2005 |
| JP | 4308055 B2 | 8/2009 |
| WO | WO 2012/043031 | 4/2012 |

OTHER PUBLICATIONS

European Office Action for corresponding EP Application No. 19 939 000.6-1103, May 2, 2022.
International Search Report for corresponding International Application No. PCT/JP2019/028588 Oct. 21, 2019.
Written Opinion for corresponding International Application No. PCT/JP2019/028588 Oct. 21, 2019.
Submission of Certification of Exceptions to Lack of Novelty of Invention filed in corresponding International Application No. PCT/JP2019/028588, Sep. 17, 2019, w/ Certification of Translation of the same, enclosing Certification to Receive Application of the Provisions of Exception to Lack of Novelty of Invention.
English translation of the Written Opinion for corresponding International Application No. PCT/JP2019/028558, Feb. 3, 2022.

* cited by examiner

LTP2 (TP1, TP2)

FIG. 17

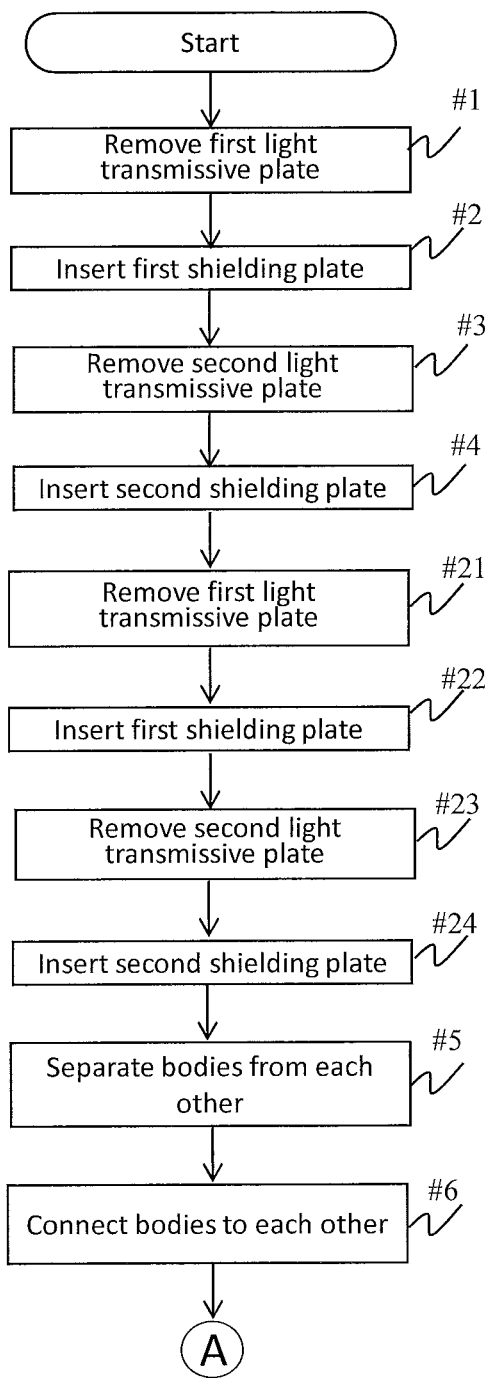

Start

Remove first light transmissive plate #1

Insert first shielding plate #2

Remove second light transmissive plate #3

Insert second shielding plate #4

Remove first light transmissive plate #21

Insert first shielding plate #22

Remove second light transmissive plate #23

Insert second shielding plate #24

Separate bodies from each other #5

Connect bodies to each other #6

A

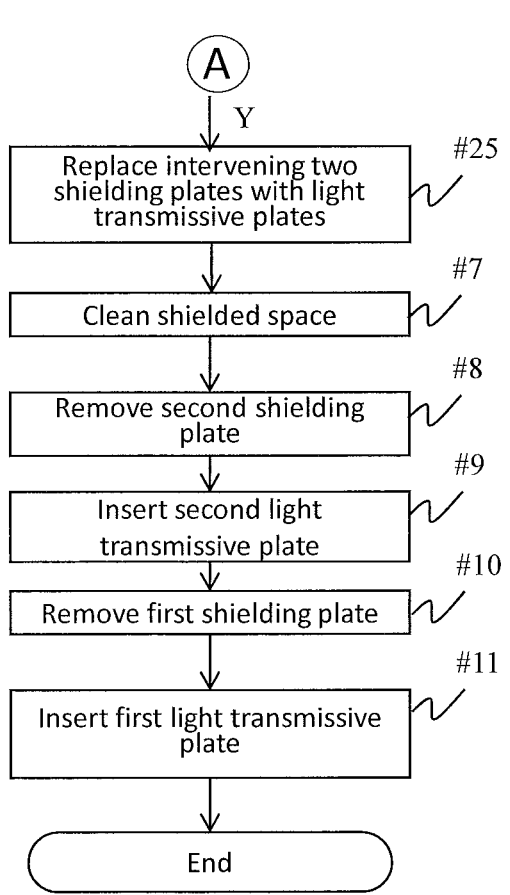

A

Y

Replace intervening two shielding plates with light transmissive plates #25

Clean shielded space #7

Remove second shielding plate #8

Insert second light transmissive plate #9

Remove first shielding plate #10

Insert first light transmissive plate #11

End

LASER WORKING MACHINE AND METHOD FOR MAINTAINING LASER WORKING MACHINE

CROSS-REFERENCE TO RELATED APPLICATIONS

The present application is a continuation application of International Application No. PCT/JP2019/028558, filed Jul. 19, 2019. The contents of this application are incorporated herein by reference in their entirety.

BACKGROUND OF THE INVENTION

Field of the Invention

The present invention relates to a laser working machine and a method for maintaining a laser working machine.

Discussion of the Background

JP 4308055B2 discloses a laser working machine that includes a machining head. To the machining head, shielding plates are attachable before replacement, cleaning, and/or other maintenance on a light concentration lens in order to prevent dust from entering a transmission optical path extending between the machining head and a laser oscillator.

SUMMARY OF THE INVENTION

According to a first embodiment of the present disclosure, a laser working machine includes a torch through which laser light is radiated to a workpiece, a first body and a second body. The first body has one end portion on which the torch is mounted and another end portion provided at a position opposite to the one end portion in a direction along a first optical path. The first body includes a first optical system configured to guide the laser light to the torch along the first optical path. The first body has a first slot provided at the another end portion. A first shielding plate and a first light transmissive plate are selectively insertable in the first slot in a sealed manner. The first shielding plate is configured to block the first optical path. The first light transmissive plate has a first optical path hole through which the first optical path and the second optical path are connectable to each other. The second body includes a second optical path optically connected to the first optical path and has a second body end portion attachable and detachable to and from the another end portion of the first body and a second slot provided at the second body end portion. A second shielding plate and a second light transmissive plate are selectively insertable in the second slot in a sealed manner. The second shielding plate is configured to block the second optical path. The second light transmissive plate has a second optical path hole through which the first optical path and the second optical path are connectable to each other.

According to a second embodiment of the present disclosure, a method is for maintaining a laser working machine. The method includes providing the laser working machine including a first body having a first optical path through which laser light passes and a second body provided above the first body and having a second optical path through which the laser light passes. The method further includes removing a first light transmissive plate having a first optical path hole through which the first optical path is to pass in a state where the first light transmissive plate is inserted into a first slot of the first body and the second light transmissive plate is into a second slot of the second body, the second light transmissive plate having a second optical path hole through which the second optical path is to pass. A first shielding plate to block the first optical path is inserted into the first slot. The second light transmissive plate is removed from the second slot. A second shielding plate to block the second optical path is inserted into the second slot. The first body and the second body are separated from each other for maintenance work performed on at least one of the first body and the second body. The first body and the second body are connected to each other in a state where the first shielding plate is inserted into the first slot and the second shielding plate is inserted into the second slot. Gas is sent through a ventilating duct of the second shielding plate to a shielded space defined between the first shielding plate and the second shielding plate to discharge the gas from the shielded space through a discharge duct of the first shielding plate. The second shielding plate is removed from the second slot. The second light transmissive plate is inserted into the second slot. The first shielding plate is removed from the first slot. The first light transmissive plate is inserted into the first slot.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein:

FIG. 17 is a flowchart of another method according to the embodiment of the present application for maintaining the laser working machine;

DESCRIPTION OF THE EMBODIMENTS

Figure 1:
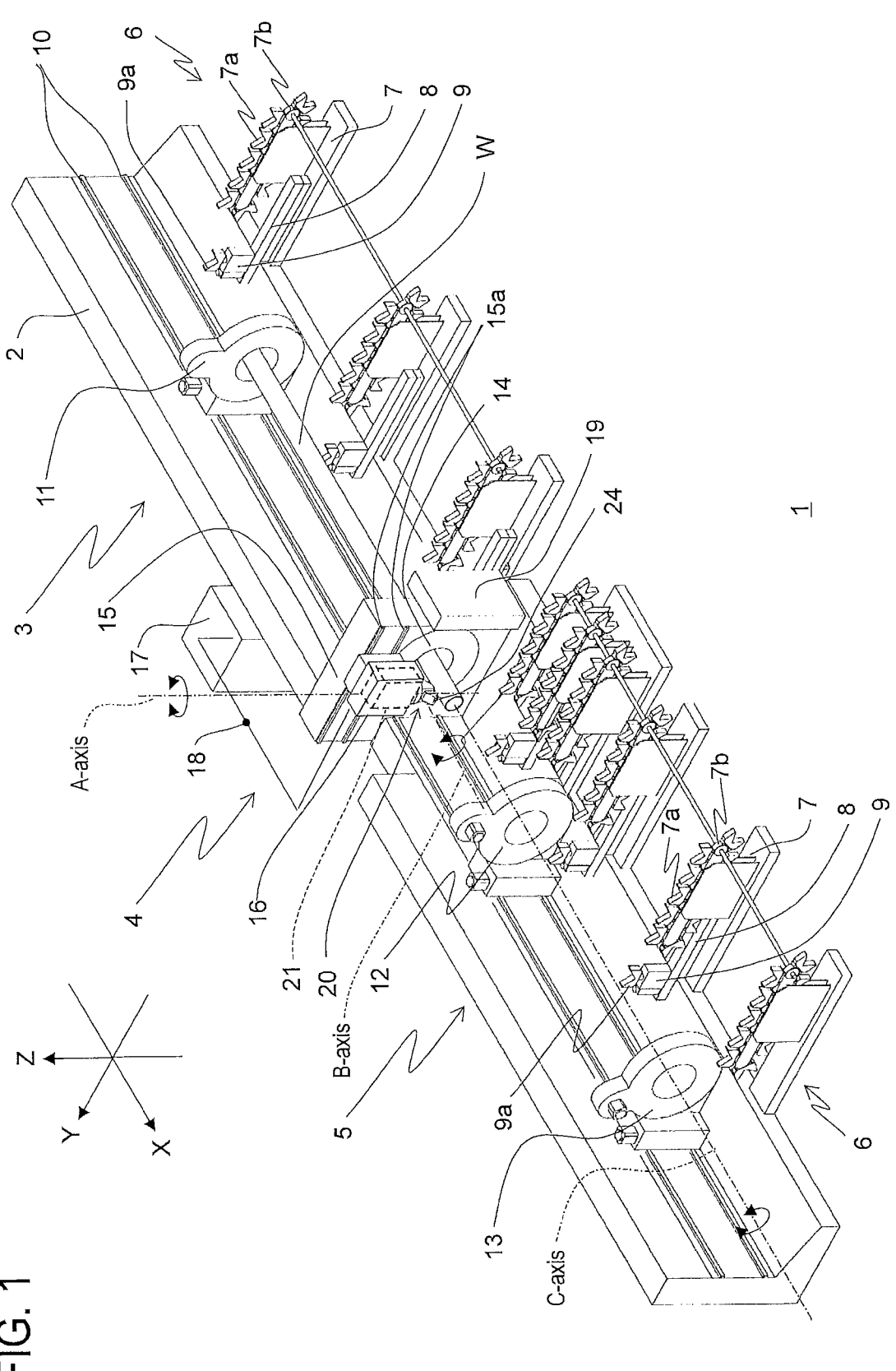
FIG. 1 illustrates a schematic configuration of a laser working machine according to an embodiment.

The embodiments will now be described with reference to the accompanying drawings, wherein like reference numerals designate corresponding or identical elements throughout the various drawings.

FIG. 1 illustrates a schematic configuration of a laser working machine 1 according to an embodiment of the present invention. As illustrated in FIG. 1, the X-axis extends along the width direction of the laser working machine 1, the Y-axis extends along the depth direction of the laser working machine 1, and the Z-axis extends along the height direction of the laser working machine 1. As illustrated in FIG. 1, the laser working machine 1 includes a machine body 2, which has a shape extending in the X direction illustrated in the drawing. The machine body 2 includes an automatic material-loading device (loader) 3, a machining device 4, and an automatic product-unloading device (unloader) 5. The automatic material-loading device 3 includes a workpiece stocker 6, which stocks workpieces W and supplies one workpiece W at a time. Each workpiece W is a pipe, an angle material, or any other long material that has the same cross-section throughout the axis of the material. The workpiece stocker 6 includes a plurality of conveyors 7. A chain 7b is wound seamlessly around each of the conveyors 7, and the chains 7b of the conveyors 7 are rotatable synchronously. On each of the chains 7b, a plurality of workpiece supports 7a are provided at predetermined spatial intervals.

The workpiece stocker 6 includes a plurality of movable frames 8. The plurality of movable frames 8 are movable synchronously on the machine body 2 in the Y direction illustrated in the drawing. At a leading end portion of each of the movable frames 8, a workpiece forwarding device 9 is provided. The workpiece forwarding device 9 is provided with an attachable and detachable workpiece mount portion 9a. The workpiece forwarding devices 9 of the workpiece forwarding devices 9 are movable upward and downward synchronously.

On the machine body 2, the guide rails 10 are laid, which extend in the X direction illustrated in the drawing. The laser working machine 1 includes three chucks 11, 12, and 13, which are provided on the guide rails 10. Each of the chucks 11, 12, and 13 holds a workpiece W and is driven into running on the guide rails 10 by a driver, thereby moving the workpiece W in the X direction. The machining device 4 is also provided with a chuck, 14. By cooperative control of the chucks 11 and 14 or the chucks 12 and 14, the workpiece W is subjected to positioning control or driven into rotation about a C-axis, which is parallel to the X-axis illustrated in the drawing, so that the workpiece W is subjected to three-dimensional laser machining.

The machining device 4 includes a column 15, a saddle 16, and a machining head 20, in addition to the chuck 14. In order to avoid interference with the workpiece W, which is movable in the X direction, the column 15 is fixed to and arranged on the machine body 2 in such a manner that the column 15 steps over the chuck 14. The column 15 includes saddle rails 15a, which extend along the Y direction. The saddle 16 is movable in the Y direction on the saddle rails 15a relative to the machine body 2. The saddle 16 is contained in a machining head body 21, which is a part of the machining head 20. The machining head 20 is movable in the Z direction relative to the saddle 16. The machining head 20 is provided with a torch 24, which is a part of the machining head 20. The torch 24 is rotatable about an A-axis, which is parallel to the Z-axis. The torch 24 is also rotatable about a B-axis, which is perpendicular to the A-axis. With this configuration, the torch 24 is positioned relative to the workpiece W. The machining device 4 further includes a laser oscillator 17 and a fiber cable 18. The laser oscillator 17 outputs laser light for machining the workpiece W. The fiber cable 18 connects the laser oscillator 17 and the machining head body 21 to each other so that laser light output from the laser oscillator 17 is supplied to the machining head body 21. The machining device 4 may further include a numerical controller 19, which controls the entirety of the laser working machine 1.

The automatic product-unloading device 5 includes a workpiece stocker 6, similarly to the automatic material-loading device 3. Specifically, the automatic product-unloading device 5 includes a plurality of conveyors 7, a plurality of movable frames 8, and a plurality of workpiece forwarding devices 9. The plurality of workpiece forwarding devices 9 receive an already-machined workpiece W held by the chucks 12 and 13, and the plurality of movable frames 8 receive the workpiece W from the plurality of workpiece forwarding devices 9 and convey the workpiece W to the plurality of conveyors 7. The plurality of conveyors 7 receive the workpiece W conveyed from the plurality of movable frames 8 and convey the workpiece W to a final discharge location.

Figure 2:
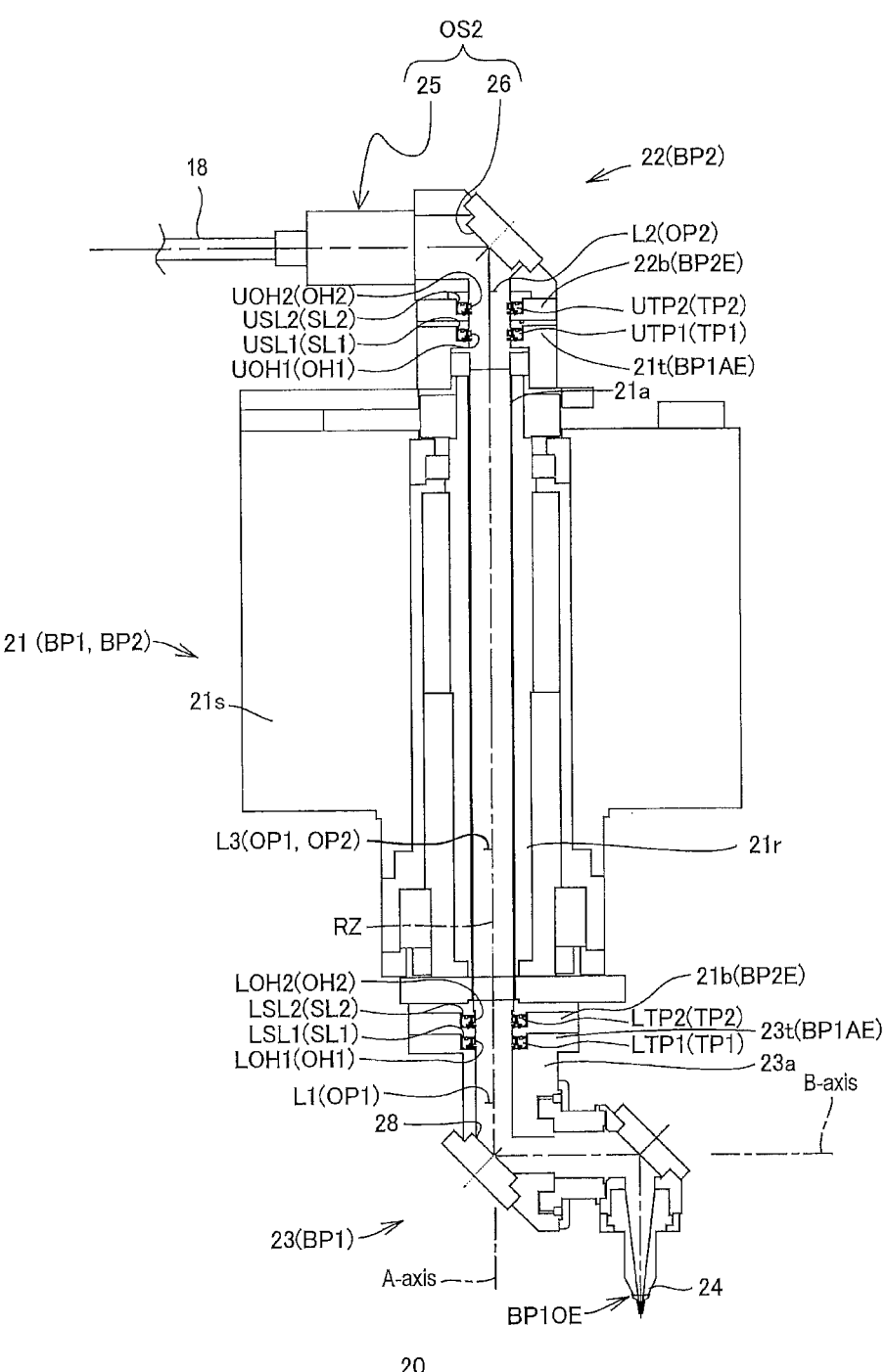
FIG. 2 illustrates a general arrangement of a machining head of the laser working machine according to the embodiment.

FIG. 2 is a cross-sectional view of the machining head 20 of the laser working machine 1 according to the embodiment. FIG. 2 is for describing an optical system of the machining head 20. For this purpose, FIG. 2 illustrates a cross-sectional view of the machining head 20 cut along a cut surface that passes through the light axis, RZ, of laser light radiated from the torch 24. Referring to FIG. 2, the machining head 20 includes the machining head body 21, an upper unit 22, and a lower unit 23. The upper unit 22 includes a fiber cable connector 25 and a mirror 26. In this embodiment, the optical system including the mirror 26 will be referred to as a second optical system OS2. The mirror 26 reflects laser light output from the fiber cable connector 25 toward the lower unit. In other words, the mirror 26 reflects laser light output from the fiber cable 18 in the downward direction of the Z-axis (A-axis). The following description is provided under the assumption that the terms upper, upward, upper end, lower, downward, and lower end are based on the Z-axis (A-axis). At the lower end, 22b, of the upper unit 22, an upper second slot USL2 is provided. When the laser working machine 1 is in use, an upper second light transmissive plate UTP2 is inserted in the upper second slot USL2. The upper unit 22 has an optical path L2, through which laser light passes, in the upper unit 22. The optical path L2 extends between the fiber cable connector 25 and the upper second slot USL2. The optical path L2 is defined by the internal space of the upper unit 22. The upper second light transmissive plate has an optical path hole UOH2, through which laser light traveling along the optical path L2 passes.

The machining head body 21 includes a support unit 21s and a rotary unit 21r, which is rotatable about the A-axis relative to a support unit 21s. The machining head body 21 includes elements such as: an A-axis motor, not illustrated, that rotates the lower unit 23 and the rotary unit 21r about the A-axis; a control circuit and a power source circuit, not illustrated, that control the A-axis motor and a B-axis motor, described later; and a gas tube through which gas is sent to the inside of the machining head 20. With this configuration, the machining head body 21 is heavier than each of the upper unit 22 and the lower unit 23. Therefore, the machining head body 21 is difficult to carry manually. At the upper end, 21t, of the machining head body 21, an upper first slot USL1 is provided. When the laser working machine 1 is in use, an upper first light transmissive plate UTP1 is inserted in the upper first slot USL1. The upper first light transmissive plate UTP1 has an optical path hole UOH1, through which laser light travelling along the optical path L2 passes. This enables the laser light to pass through a pipe 21a of the machining head body 21. That is, the machining head body 21 has the pipe 21a. The pipe 21a is attachable and detachable relative to other elements of the machining head body 21 so that the pipe 21a is replaceable when the pipe 21a is damaged or contaminated by dust in a factory. At the lower end, 21b, of the machining head body 21, a lower second slot LSL2 is provided. When the laser working machine 1 is in use, a lower second light transmissive plate LTP2 is inserted in the lower second slot LSL2. At the inside of the machining head body 21, the machining head body 21 has an optical path L3, which extends between the upper first slot USL1 and the lower second slot LSL2 and through which laser light passes. The optical path L3 is mainly defined by the pipe 21a. The lower second light transmissive plate LTP2 has an optical path hole LOH2, through which laser light traveling along the optical path L3 passes.

The lower unit 23 is rotatable about the A-axis relative to the support unit 21s of the machining head body 21 by the rotation axis of the A-axis motor via an A-axis rotation transmission mechanism, not illustrated. The lower unit 23 has an A-axis rotation member 23a, which is mounted on the lower end 21b of the machining head body 21 and is rotatable about the A-axis relative to the support unit 21s of the machining head body 21. The A-axis rotation member 23a includes the B-axis motor and a B-axis rotation transmission mechanism, not illustrated, that rotate a B-axis rotation member 23b and the torch 24, described later, about the B-axis. The lower unit 23 further includes the B-axis rotation member 23b and the torch 24, which are rotatable about the B-axis relative to the A-axis rotation member 23a. At the upper end, 23t, of the A-axis rotation member 23a, a lower first slot LSL1 is provided. When the laser working machine 1 is in use, a lower first light transmissive plate LTP1 is inserted in the lower first slot LSL1. The lower first light transmissive plate LTP1 has an optical path hole LOH1, through which laser light traveling along the optical path L3 passes. Also at the A-axis rotation member 23a, a mirror 28 is provided. That is, the lower unit 23 includes the mirror 28. The mirror 28 receives laser light reflected by the mirror 26 and reflects the laser light toward the torch 24. The lower unit 23 may further include a light concentration lens and/or related elements, not illustrated, to concentrate the laser light reflected by the mirror 28.

The laser working machine 1 includes the torch 24, which radiates laser light to the workpiece W. At the inside of the lower unit 23, the lower unit 23 has an optical path L1, which extends between the lower first slot LSL1 and the torch 24 and through which laser light passes. The optical path L1 is defined by the internal space of the lower unit 23. In this embodiment, the mirror 28 and the light concentration lens and related elements, not illustrated, will be collectively referred to as a first optical system OS1.

In the laser working machine 1, gas fills the internal space of the lower unit 23, which defines the optical path L1; the internal space of the upper unit 22, which defines the optical path L2; and the internal space of the pipe 21a, which defines the optical path L3. The gas is supplied from the upper unit 22 and pressurized such that the internal pressure applied by the gas is higher than the external pressure applied by the air around the laser working machine 1. This ensures that if a gap is formed between the members defining the optical paths L1, L2, and L3, the gas gushes out of the internal space, preventing dust from entering the optical paths L1, L2, and L3.

Figure 3:
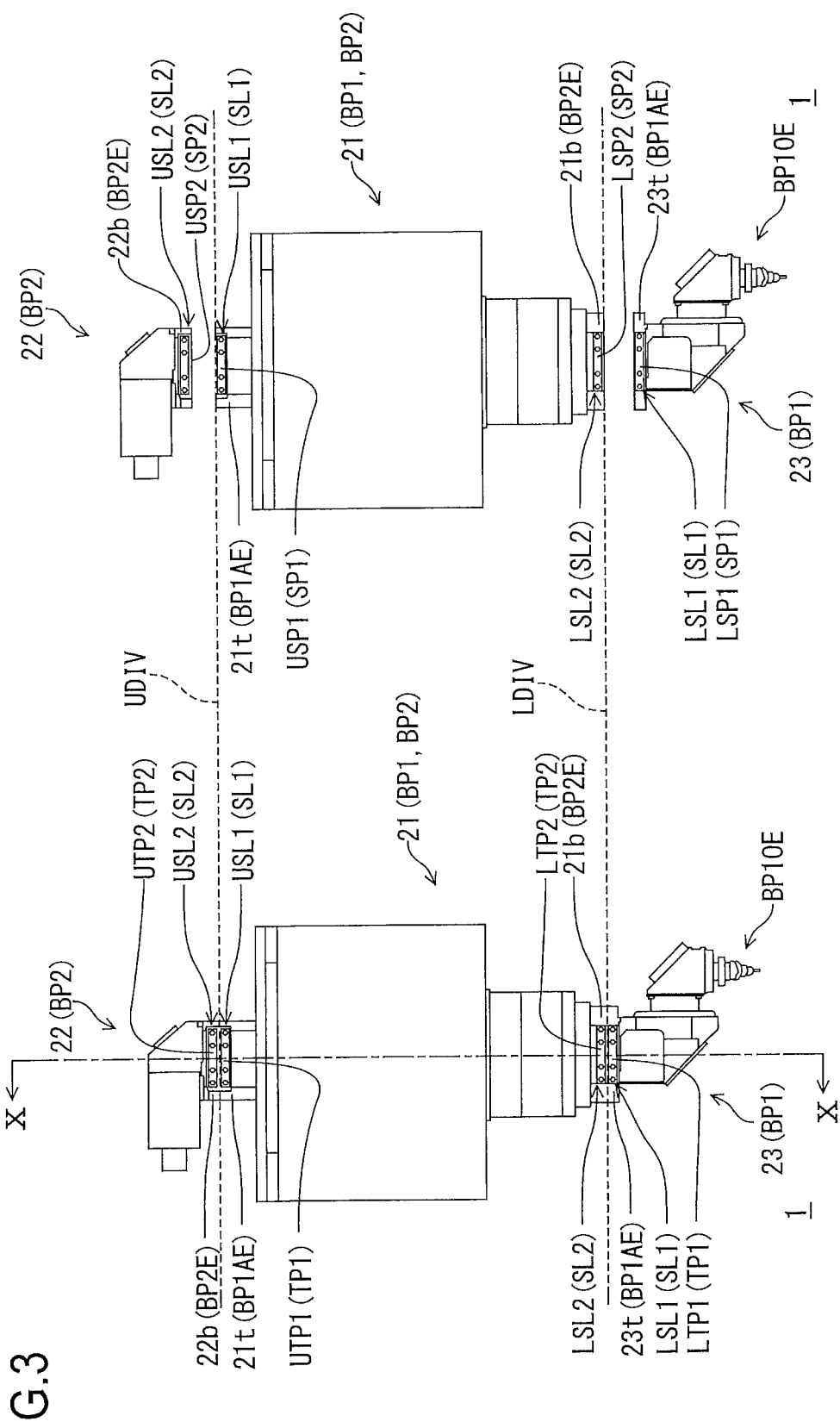
FIG. 3 illustrates a divided portion at which the machining head is divided.

The upper unit 22 is separatable from the machining head body 21 for maintenance work such as cleaning or replacement of the mirror 26 and work of connecting the fiber cable 18. Specifically, as illustrated in FIG. 3, the upper unit 22 is separatable from the machining head body 21 at an upper dividing position UDIV. The upper dividing position UDIV is located between the upper first slot USL1 and the upper second slot USL2 in the Z-axis (A-axis) direction. Similarly, the lower unit 23 is separatable from the machining head body 21 for maintenance work such as cleaning or replacement of the mirror 28. Specifically, the lower unit 23 is separatable from the machining head body 21 at a lower dividing position LDIV. The lower dividing position LDIV is located between the lower first slot LSL1 and the lower second slot LSL2 in the Z-axis (A-axis) direction.

In the upper second slot USL2, the upper second light transmissive plate UTP2 and an upper second shielding plate USP2 are selectively insertable in a sealed manner. The upper second shielding plate USP2 is for shielding the optical path L2. In the upper first slot USL1, the upper first light transmissive plate UTP1 and an upper first shielding plate USP1 are selectively insertable in a sealed manner. The upper first shielding plate USP1 is for shielding the optical path L3. In the lower second slot LSL2, the lower second light transmissive plate LTP2 and a lower second shielding plate LSP2 are selectively insertable in a sealed manner. In the lower first slot LSL1, the lower first light transmissive plate LTP1 and the lower first shielding plate LSP1 are selectively insertable in a sealed manner. The lower first light transmissive plate LTP1 is for shielding the optical path L1. The lower first shielding plate LSP1 is for shielding the optical path L3.

With this configuration, as illustrated in the right area of FIG. 3, when the upper unit 22 is separated from the machining head body 21, the upper second shielding plate USP2 is inserted in the upper second slot USL2, instead of the upper second light transmissive plate UTP2; and the upper first shielding plate USP1 is inserted in the upper first slot USL1, instead of the upper first light transmissive plate UTP1. When the lower unit 23 is separated from the machining head body 21, the lower second shielding plate LSP2 is inserted in the lower second slot LSL2, instead of the lower second light transmissive plate LTP2; and the lower first shielding plate LSP1 is inserted in the lower first slot LSL1, instead of the lower first light transmissive plate LTP1.

Figure 4:
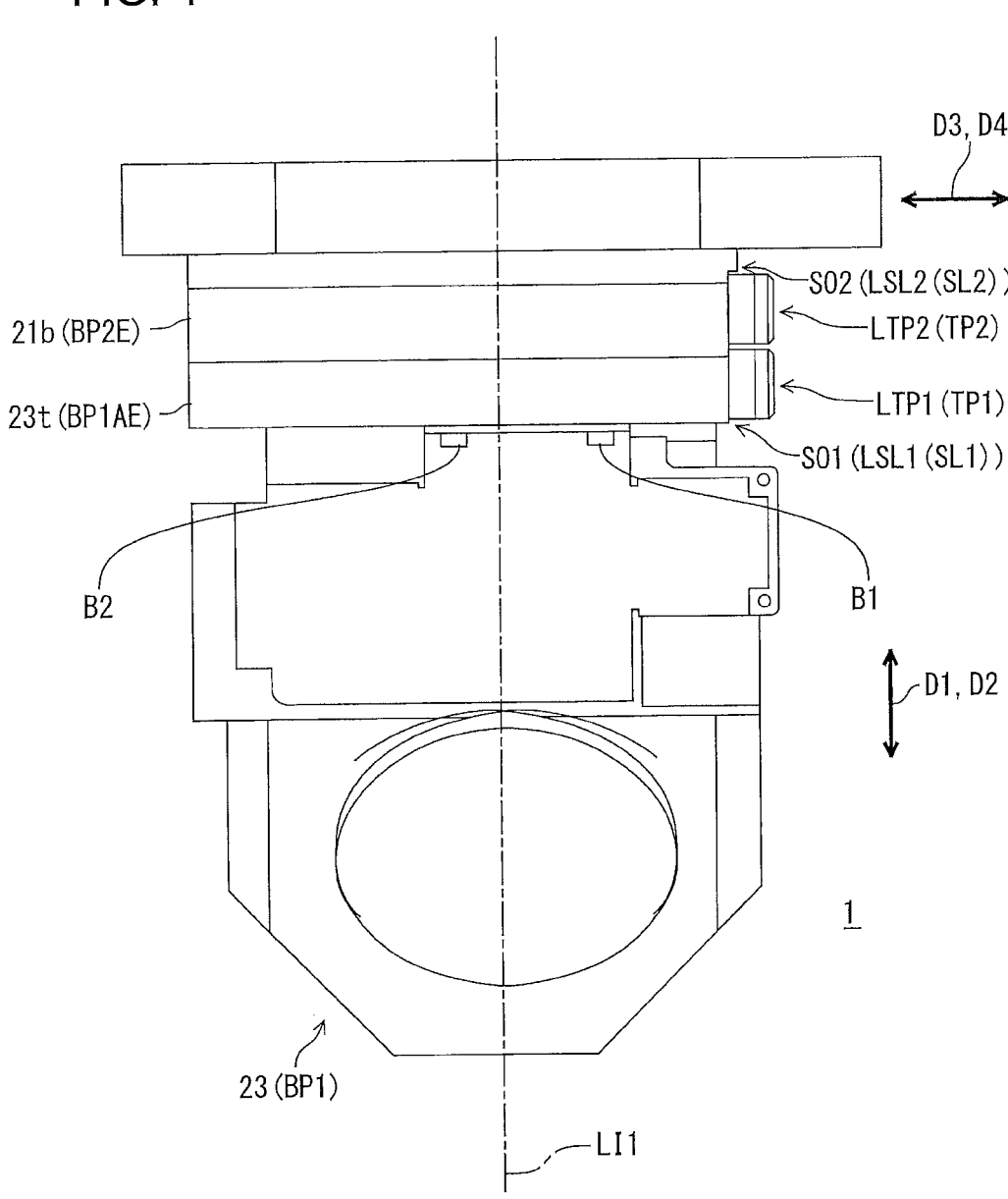
FIG. 4 is an enlarged view of a lower unit and elements near the lower unit, illustrating a state in which the lower unit is mounted on a machining head body.
Figure 5:
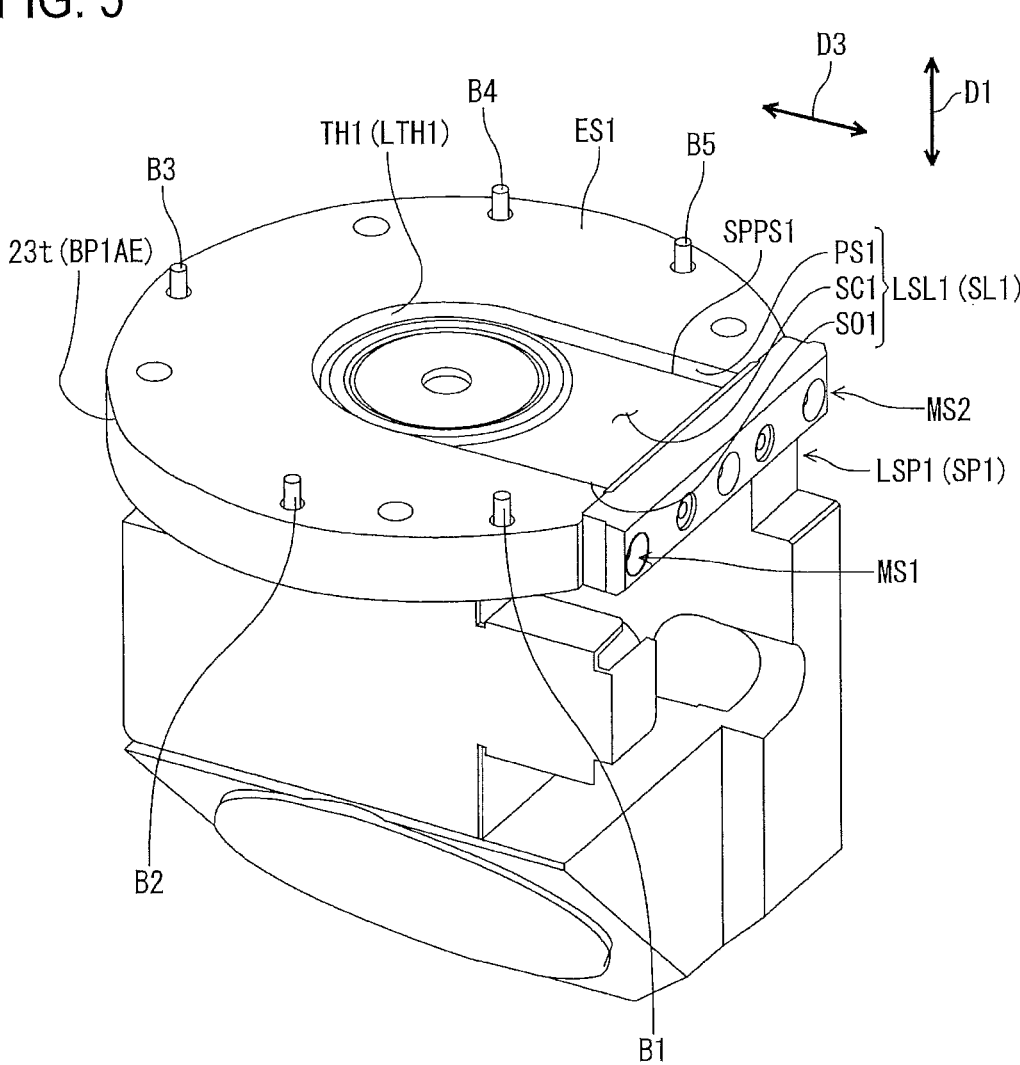
FIG. 5 is a perspective view of the lower unit in separated state.
Figure 6:
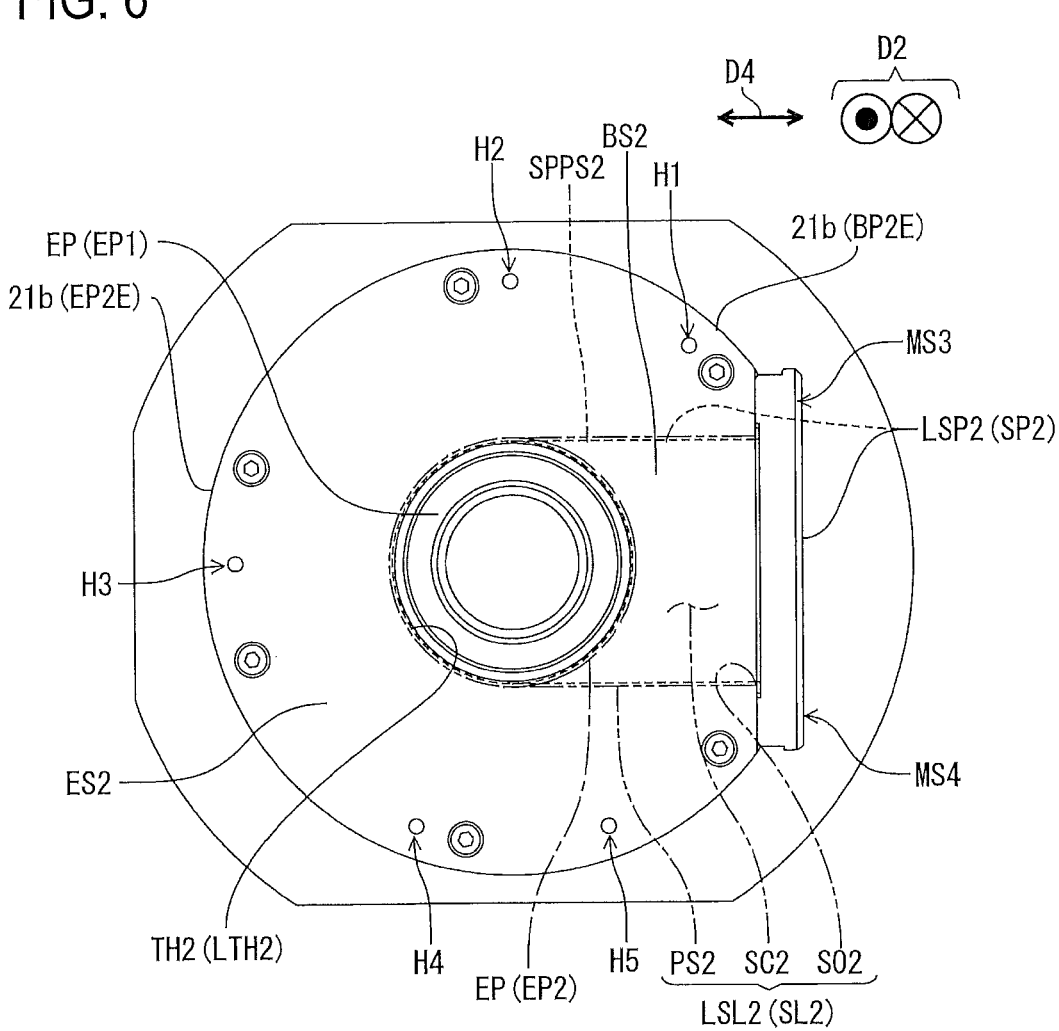
FIG. 6 is a bottom view of the machining head body with the lower unit in separated state.

Next, description will be made with regard to details of: the mount structure in which the lower unit 23 is mounted on the machining head body 21; and the mount structure in which the upper unit 22 is mounted on the machining head body 21. Referring to FIGS. 4 to 6, the lower unit 23 is mounted on the lower end 21b of the machining head body 21 with bolts B1 to B5. The bolts B1 to B5 are respectively screwed in screw holes H1 to H5 illustrated in FIGS. 5 and 6. While the bolts B1 to B5 are illustrated in FIG. 5 by way of description, the bolts B1 to B5 are removed when the lower unit 23 is removed from the machining head body 21 in actual situations. As illustrated in FIG. 5, when the lower unit 23 is separated from the machining head body 21, the lower first shielding plate LSP1 is inserted in the lower first slot LSL1. In this respect, the lower first shielding plate LSP1 is fixed to the upper end 23t of the lower unit 23 with screws MS1 and MS2. As illustrated in FIG. 6, when the lower unit 23 is separated from the machining head body 21, the lower second shielding plate LSP2 is inserted in the lower second slot LSL2. In this respect, the lower second shielding plate LSP2 is fixed to the lower end 21b of the machining head body 21 with screws MS3 and MS4.

Figure 7:
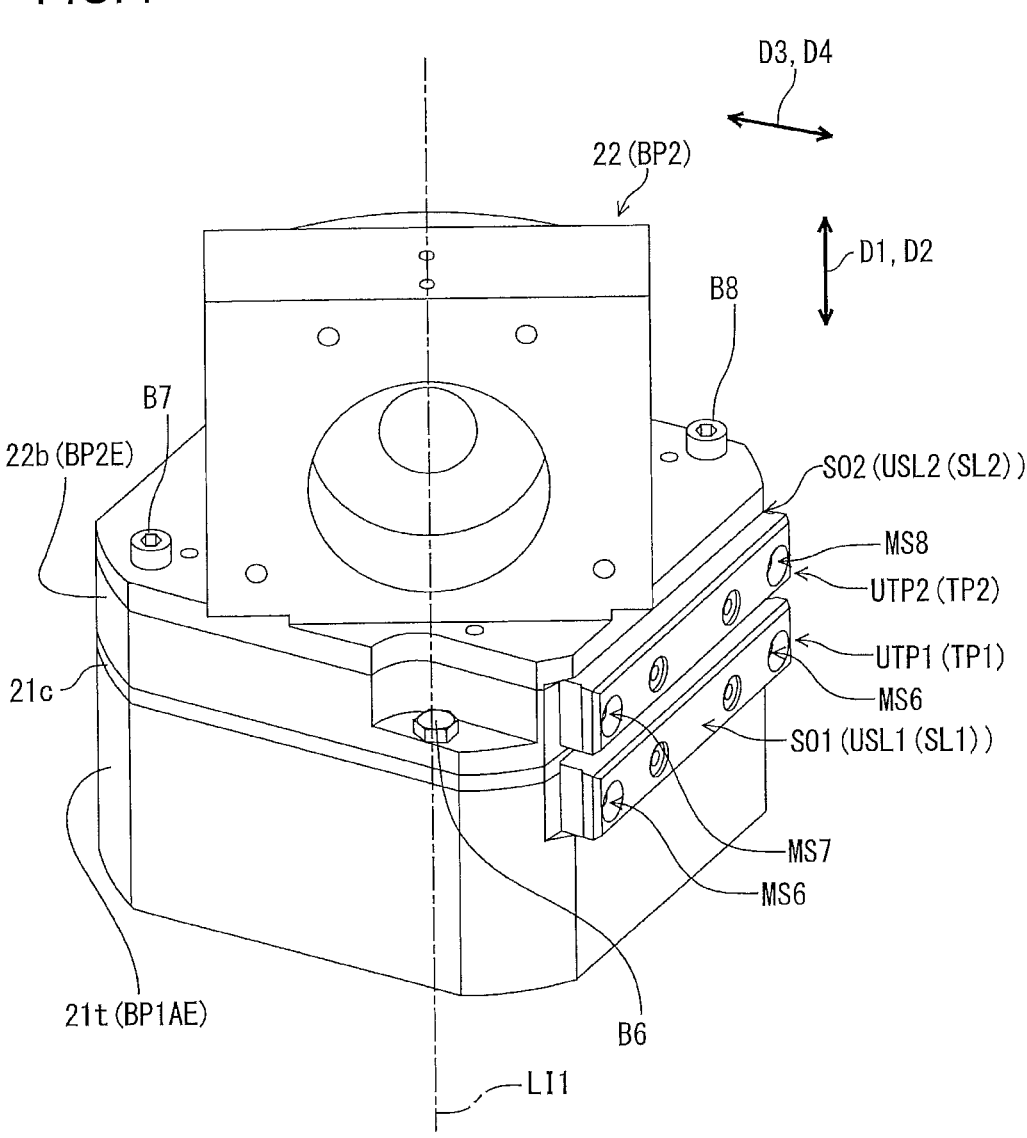
FIG. 7 is an enlarged view of an upper unit and elements near the upper unit, illustrating a state in which the upper unit is mounted on the machining head body.
Figure 8:
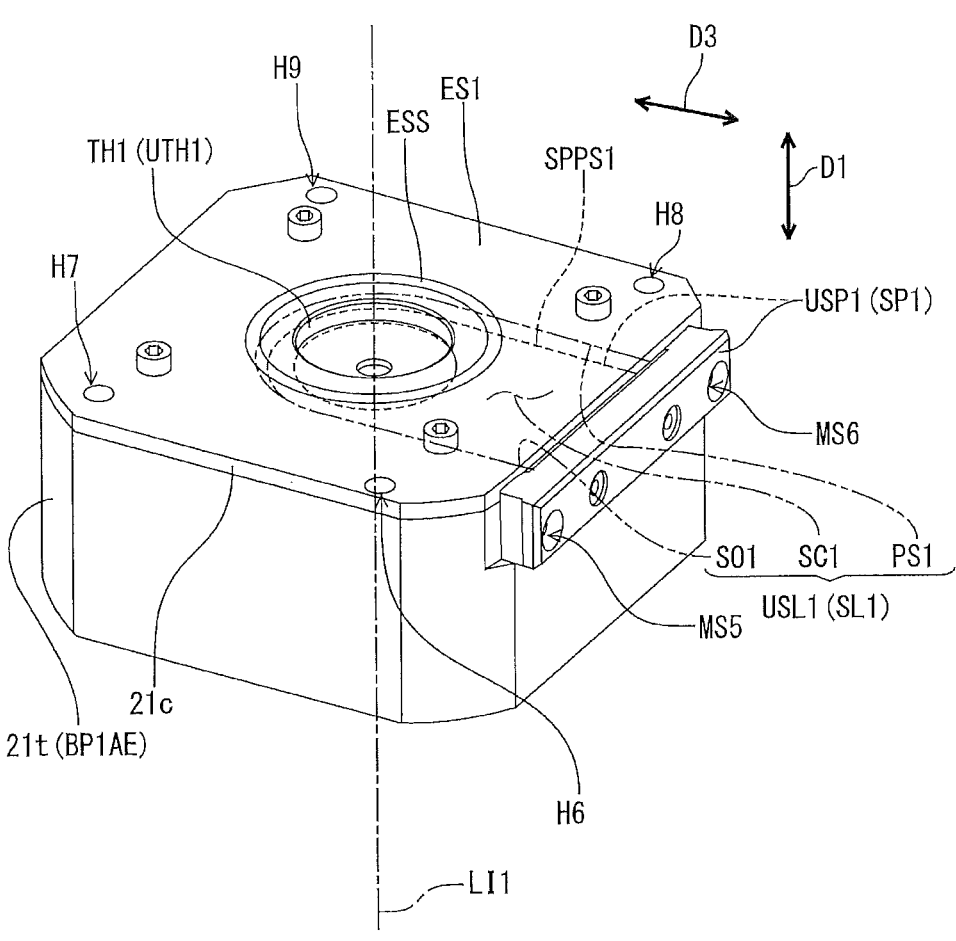
FIG. 8 is a perspective view, seen from an upper position, of the machining head body with the upper unit in separated state.
Figure 9:
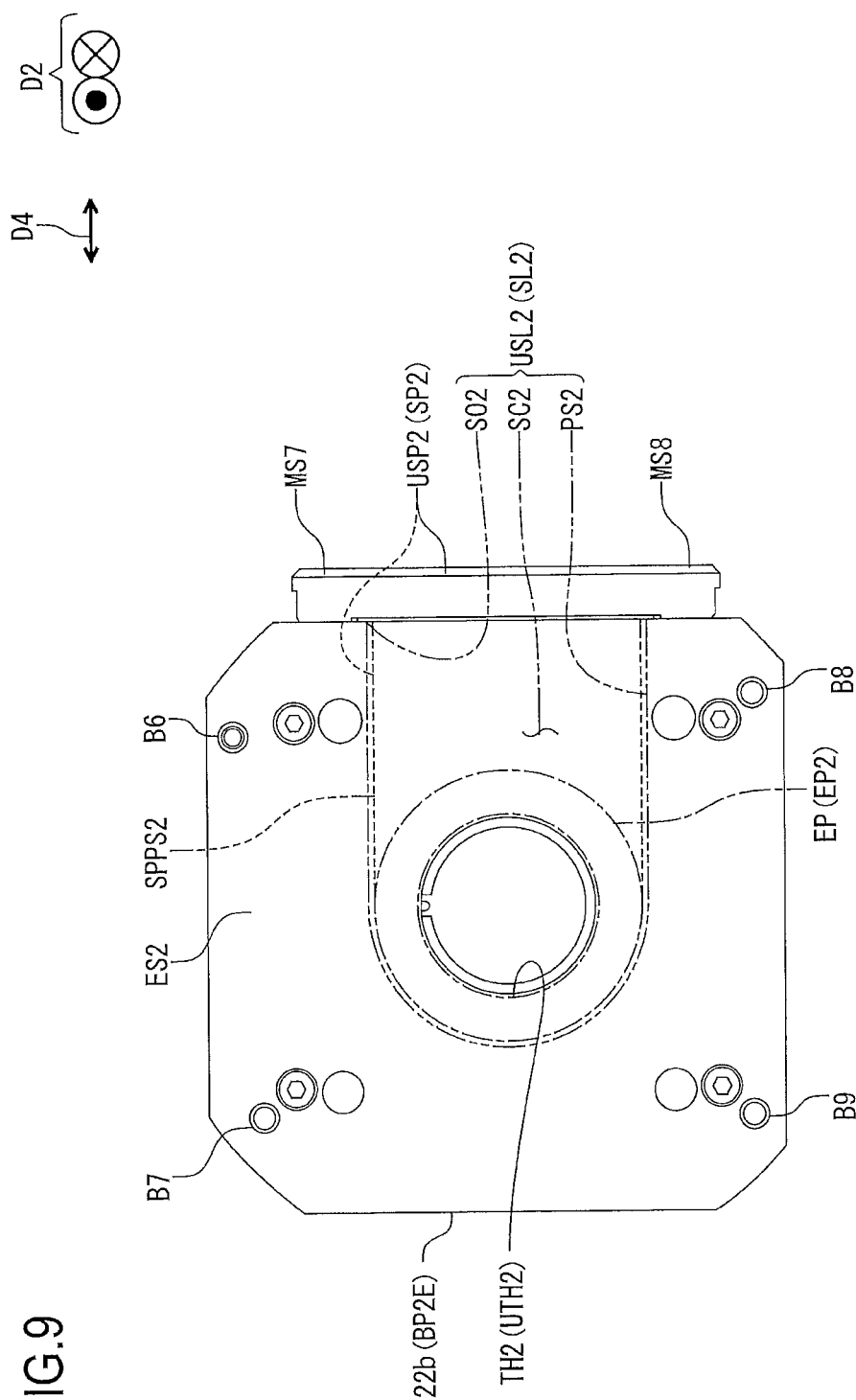
FIG. 9 is a bottom view of the machining head body with the upper unit in separated state.

Referring to FIGS. 7 to 9, the upper unit 22 is mounted on the upper end 21t of the machining head body 21 with bolts B6 to B9. The bolts B6 to B9 are respectively screwed in screw holes H6 to H9 illustrated in FIG. 8. While the bolts B6 to B9 are illustrated in FIG. 9 by way of description, the bolts B6 to B9 are removed when the upper unit 22 is removed from the machining head body 21 in actual situations. As illustrated in FIG. 8, when the upper unit 22 is separated from the machining head body 21, the upper first shielding plate USP1 is inserted in the upper first slot USL1. In this respect, the upper first shielding plate USP1 is fixed to the upper end 21t of the machining head body 21 with screws MS5 and MS6. As illustrated in FIG. 9, when the upper unit 22 is separated from the machining head body 21, the upper second shielding plate USP2 is inserted in the upper second slot USL2. In this respect, the upper second shielding plate USP2 is fixed to the lower end 22b of the upper unit 22 with screws MS7 and MS8.

In this embodiment, the positional relationship between the upper dividing position UDIV and the upper first slot USL1 and the upper second slot USL2 is different from the positional relationship between the lower dividing position LDIV and the lower first slot LSL1 and the lower second slot LSL2. The plurality of members defining the upper first slot USL1 and the upper second slot USL2 are different from the plurality of members defining the lower first slot LSL1 and the lower second slot LSL2. More specifically, a lid member 21c exists between the upper first slot USL1 and the upper second slot USL2 as illustrated in FIGS. 7 and 8, while no lid member 21c exists between the lower first slot LSL1 and the lower second slot LSL2. However, the holes in the upper first slot USL1, the upper second slot USL2, the lower first slot LSL1, and the lower second slot LSL2 are identical in shape. Further, the upper first light transmissive plate UTP1, the upper second light transmissive plate UTP2, the lower first light transmissive plate LTP1, and the lower second light transmissive plate LTP2 are identical in structure. Further, as detailed later, the structure of the upper first shielding plate USP1 is identical to the structure of the lower first shielding plate LSP1. Similarly, the structure of the upper second shielding plate USP2 is identical to the structure of the lower second shielding plate LSP2.

In the following description of the embodiment, the upper first slot USL1 and the lower first slot LSL1 will be collectively referred to as a first slot SL1, and the upper second slot USL2 and the lower second slot LSL2 will be collectively referred to as a second slot SL2. The upper first light transmissive plate UTP1 and the lower first light transmissive plate LTP1 will be collectively referred to as a first light transmissive plate TP1, and the upper second light transmissive plate UTP2 and the lower second light transmissive plate LTP2 will be collectively referred to as a second light transmissive plate TP2. The optical path holes UOH1 and LOH1 will be collectively referred to as a first optical path hole OH1, and the optical path holes UOH2 and LOH2 will be collectively referred to as a second optical path hole OH2. The upper first shielding plate USP1 and the lower first shielding plate LSP1 will be collectively referred to as a first shielding plate SP1, and the upper second shielding plate USP2 and the lower second shielding plate LSP2 will be collectively referred to as a second shielding plate SP2. Unless noted otherwise, the following description will be provided under the assumption that a structure described as the first slot SL1 is a structure common to the upper first slot USL1 and the lower first slot LSL1; a structure described as the second slot SL2 is a structure common to the upper second slot USL2 and the lower second slot LSL2; a structure described as the second light transmissive plate TP2 is a structure common to the upper second light transmissive plate UTP2 and the lower second light transmissive plate LTP2.

Also, a housing that is defined by the machining head body 21, the upper unit 22, and/or the lower unit 23 and that constitutes a portion extending between a divided portion corresponding to the first slot SL1 and the torch 24 will be referred to as a first body BP1. Also, a housing that is defined by the machining head body 21, the upper unit 22, and/or the lower unit 23 and that constitutes a portion extending between a divided portion corresponding to the second slot SL2 and the fiber cable connector 25 will be referred to as a second body BP2. Thus, in the context of dividing of the machining head 20 at the lower dividing position LDIV, the lower unit 23 will be regarded as the first body BP1, and the machining head body 21 and the upper unit 22 will be regarded as the second body BP2. In the context of dividing of the machining head 20 at the upper dividing position UDIV, the lower unit 23 and the machining head body 21 will be regarded as the first body BP1, and the upper unit 22 will be regarded as the second body BP2.

Further, one end portion of the first body BP1, which is defined above, at which the torch 24 is provided will be referred to as one end portion BP1OE, and another end portion of the first body BP1 at which the first slot SL1 is provided will be referred to as the another end portion BP1AE. One end portion of the second body BP2 at which the second slot SL2 is provided will be referred to as the second body end portion BP2E. Thus, the one end portion BP1OE of the first body BP1 is a portion near the torch 24 of the B-axis rotation member 23b. In the context of dividing of the machining head 20 at the lower dividing position LDIV, the upper end 23t of the lower unit 23 will be regarded as the another end portion BP1AE, and the lower end 21b of the machining head body 21 will be regarded as the second body end portion BP2E. In the context of dividing of the machining head 20 at the upper dividing position UDIV, the upper end 21t of the machining head body 21 will be regarded as the another end portion BP1AE, and the lower end 22b of the upper unit 22 will be regarded as the second body end portion BP2E.

An optical path that is defined by the optical paths L1, L2, and/or L3 and that belongs to the first body BP1 will be referred to as a first optical path OP1; and an optical path that is defined by the optical paths L1, L2, and/or L3 and that belongs to the second body BP2 will be referred to as a second optical path OP2. Thus, in the context of dividing of the machining head 20 at the lower dividing position LDIV, the optical path L1 will be regarded as the first optical path OP1, and the optical paths L2 and L3 will be regarded as the second optical path OP2. In the context of dividing of the machining head 20 at the upper dividing position UDIV, the optical paths L1 and L3 will be regarded as the first optical path OP1, and the optical path L2 will be regarded as the second optical path OP2.

With the above-described definitions taken into consideration, the left area of FIG. 3 illustrates the laser working machine 1 such that the first light transmissive plate TP1 is inserted in the first slot SL1 and that the second light transmissive plate TP2 is inserted in the second slot SL2. The right area of FIG. 3 illustrates the laser working machine 1 such that the first shielding plate SP1 is inserted in the first slot SL1 and that the second shielding plate SP2 is inserted in the second slot SL2. It is to be noted that in the right area of FIG. 3, one unit of the upper unit 22 and the lower unit 23 may be connected to the machining head body 21, and the first light transmissive plate TP1 and the second light transmissive plate TP2 may be respectively inserted in the first slot SL1 and the second slot SL2, which face each other across the divided portion located between one of the above units and the machining head body 21.

The following configuration additionally applies if FIGS. 2 and 3 are taken into consideration. The laser working machine 1 includes the first body BP1, which has: the one end portion BP1OE, at which the torch 24 is provided; the another end portion BP1AE, which is opposite to the one end portion BP1OE in a direction along the first optical path OP1; and the first optical system OS1, which guides laser light to the torch 24 along the first optical path OP1. The laser working machine 1 includes the second body BP2, which has: the second body end portion BP2E, which is attachable and detachable to and from the another end portion BP1AE of the first body BP1; and the second optical path OP2, which is optically connected to the first optical path OP1. The laser working machine 1 includes the first slot SL1 at the another end portion BP1AE of the first body BP1. In the first slot SL1, the first shielding plate SP1 and the first light transmissive plate TP1 are selectively insertable in a sealed manner. The first shielding plate SP1 is configured to block the first optical path OP1. The first light transmissive plate TP1 has the first optical path hole OH1, through which the first optical path OP1 and the second optical path OP2 are connectable to each other. The laser working machine 1 includes the second slot SL2 at the second body end portion BP2E of the second body BP2. In the second slot SL2, the second shielding plate SP2 and the second light transmissive plate TP2 are selectively insertable in a sealed manner. The second shielding plate SP2 is for shielding the second optical path OP2. The second light transmissive plate TP2 has the second optical path hole OH2, through which the first optical path OP1 and the second optical path OP2 are connectable to each other.

Figure 10:
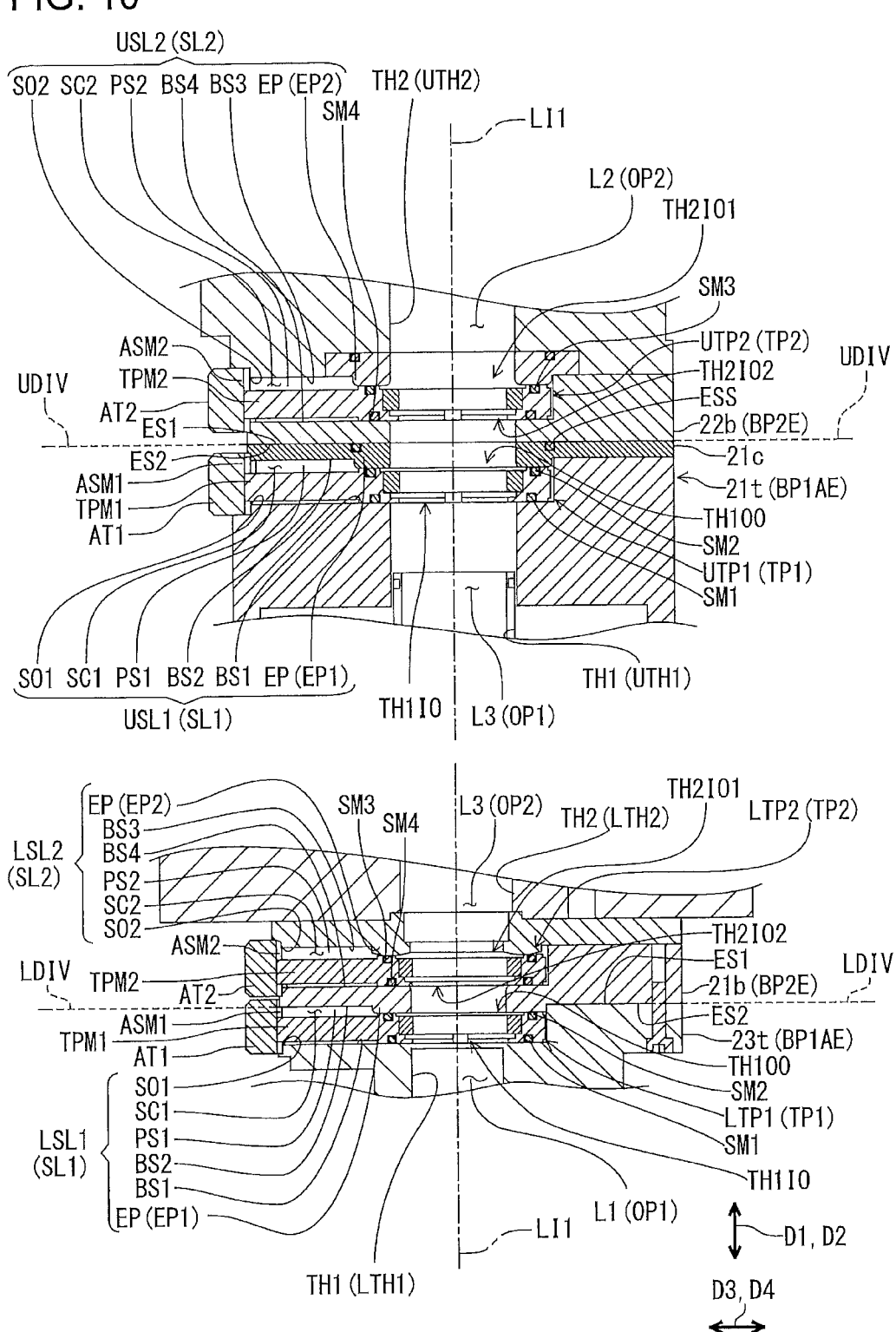
FIG. 10 is a cross-sectional view of the machining head cut along the line X-X illustrated in FIG. 3.

Next, the shapes of the first slot SL1 and the second slot SL2 will be described in detail. FIG. 10 is a cross-sectional view of the machining head cut along the line X-X illustrated in FIG. 3. As described above, the holes of the upper first slot USL1, the upper second slot USL, the lower first slot LSL1, and the lower second slot LSL2 are identical to each other in internal shape. In light of this configuration, shapes common to the upper first slot USL1 and the lower first slot LSL1 will be assigned the same reference numerals and/or symbols. Shapes common to the upper second slot USL2 and the lower second slot LSL2 will be assigned the same reference numerals and/or symbols.

Referring to FIG. 10, the another end portion BP1AE (21t, 23t) of the first body BP1 has a first through hole TH1, which defines the first optical path OP1 and extends in a first optical path extending direction D1. By way of description, the first through hole TH1 of the upper end 23t of the lower unit 23 will be referred to as a lower first through hole LTH1, and the first through hole TH1 of the upper end 21t of the machining head body 21 will be referred to as an upper first through hole UTH1. The lower first through hole LTH1 defines an optical path that is included in the optical path L1 and that extends between the lower first slot LSL1 and the mirror 28. The upper first through hole UTH1 defines the optical path L3.

Further, the second body end portion BP2E has a second through hole TH2, which defines the second optical path OP2 and extends in a second optical path extending direction D2. By way of description, the second through hole TH2 of the lower end 21b of the machining head body 21 will be referred to as a lower second through hole LTH2, and the second through hole TH2 of the lower end 22b of the upper unit 22 will be referred to as an upper second through hole UTH2. The lower second through hole LTH2 defines the optical path L3. The upper second through hole UTH2 defines an optical path that is included in the optical path L2 and that extends between the upper second slot USL2 and the mirror 26. In this embodiment, the center axis of the first through hole TH1 and the center axis of the second through hole TH2 are substantially on a common line LI1.

Referring to FIGS. 5, 8, and 10, the first slot SL1 is defined by a first base surface BS1, a second base surface BS2, and a first outer circumferential surface PS1. The first base surface BS1 has an inner opening TH1IO of the first through hole TH1. The inner opening TH1IO refers to an opening that is not exposed to the outside because of the existence of the first shielding plate SP1 when the first body BP1 and the second body BP2 are separated from each other. The second base surface BS2 faces the first base surface BS1 in the first optical path extending direction D1. The second base surface BS2 has a facing opening TH1OO, which faces the inner opening TH1IO of the first through hole TH1 in the first optical path extending direction D1. The first outer circumferential surface PS1 extends in the second optical path extending direction D2 between a third base surface BS3 and a fourth base surface BS4.

Referring to FIGS. 6, 9, and 10, the second slot SL2 is defined by the third base surface BS3, the fourth base surface BS4, and a second outer circumferential surface PS2. The third base surface BS3 has a first inner opening TH2IO1 of the second through hole TH2. The fourth base surface BS4 faces the third base surface BS3 in the second optical path extending direction D2. The fourth base surface BS4 has a second inner opening TH2IO2 of the second through hole TH2. The second inner opening TH2IO2 faces the first inner opening TH2IO1 of the second through hole TH2 in the second optical path extending direction D2. The second outer circumferential surface PS2 extends in the second optical path extending direction D2 between the third base surface BS3 and the fourth base surface BS4. It is to be noted that the vertical-position relationship between the third base surface BS3 and the fourth base surface BS4 is opposite to the vertical-position relationship between the first base surface BS1 and the second base surface BS2.

Referring to FIGS. 5, 8, and 10, the first slot SL1 has a first slot opening SO1 and a first connection portion SC1. The first slot opening SO1 is an insertion hole for the first shielding plate SP1 and the first light transmissive plate TP1. The first connection portion SC1 extends from the first slot opening SO1 to the first through hole TH1 in a first slot extending direction D3, which is non-parallel to the first optical path extending direction D1, and the first connection portion SC1 is connected to the first through hole TH1. Referring to FIGS. 6, 9, and 10, the second slot SL2 has a second slot opening SO2 and a second connection portion SC2. The second slot opening SO2 is an insertion hole for the second shielding plate SP2 and the second light transmissive plate TP2. The second connection portion SC2 extends from the second slot opening SO2 to the second through hole TH2 in a second slot extending direction D4, which is non-parallel to the second optical path extending direction D2, and the second connection portion SC2 is connected to the second through hole TH2.

Referring to FIGS. 4, 7, and 10, the second slot extending direction D4 is substantially parallel to the first slot extending direction D3. The first slot opening SO1 and the second slot opening SO2 are close to each other. This facilitates the replacement work of the first light transmissive plate TP1 and the second light transmissive plate TP2 and the replacement work of the first shielding plate SP1 and the second shielding plate SP2 in the first slot SL1 and the second slot SL2. Also, the first slot extending direction D3 and the second slot extending direction D4 are substantially perpendicular to the above-described common line LIL This configuration ensures that the first light transmissive plate TP1, the second light transmissive plate TP2, the first shielding plate SP1, the second shielding plate SP2, the first slot SL1, and the second slot SL2 can be diminished in size. That is, the above configuration reduces the risk of dust entering through the first slot SL1 and the second slot SL2.

Further, referring to FIGS. 6, 9, 10, and 11, at least one slot base surface among the first base surface BS1, the second base surface BS2, the third base surface BS3, and the fourth base surface BS4 has at least one protrusion EP. Preferably, the at least one protrusion EP is provided around the opening of the at least one slot base surface, namely, the inner opening TH1IO of the first through hole TH1, the facing opening TH1OO, the first inner opening TH2IO1 of the second through hole TH2, or the second inner opening TH2IO2. The at least one protrusion EP protrudes toward the inside of the first slot SL1 or the second slot SL2 that the slot base surface faces. Specifically, the second base surface BS2 has a first protrusion EP1, which preferably protrudes downward. The third base surface BS3 has a second protrusion EP2, which preferably protrudes downward. It is to be noted that in the front view of the lid member 21c illustrated in FIG. 11, the first through hole TH1 and a groove 21g are indicated by dotted lines by way of description.

Figure 11:
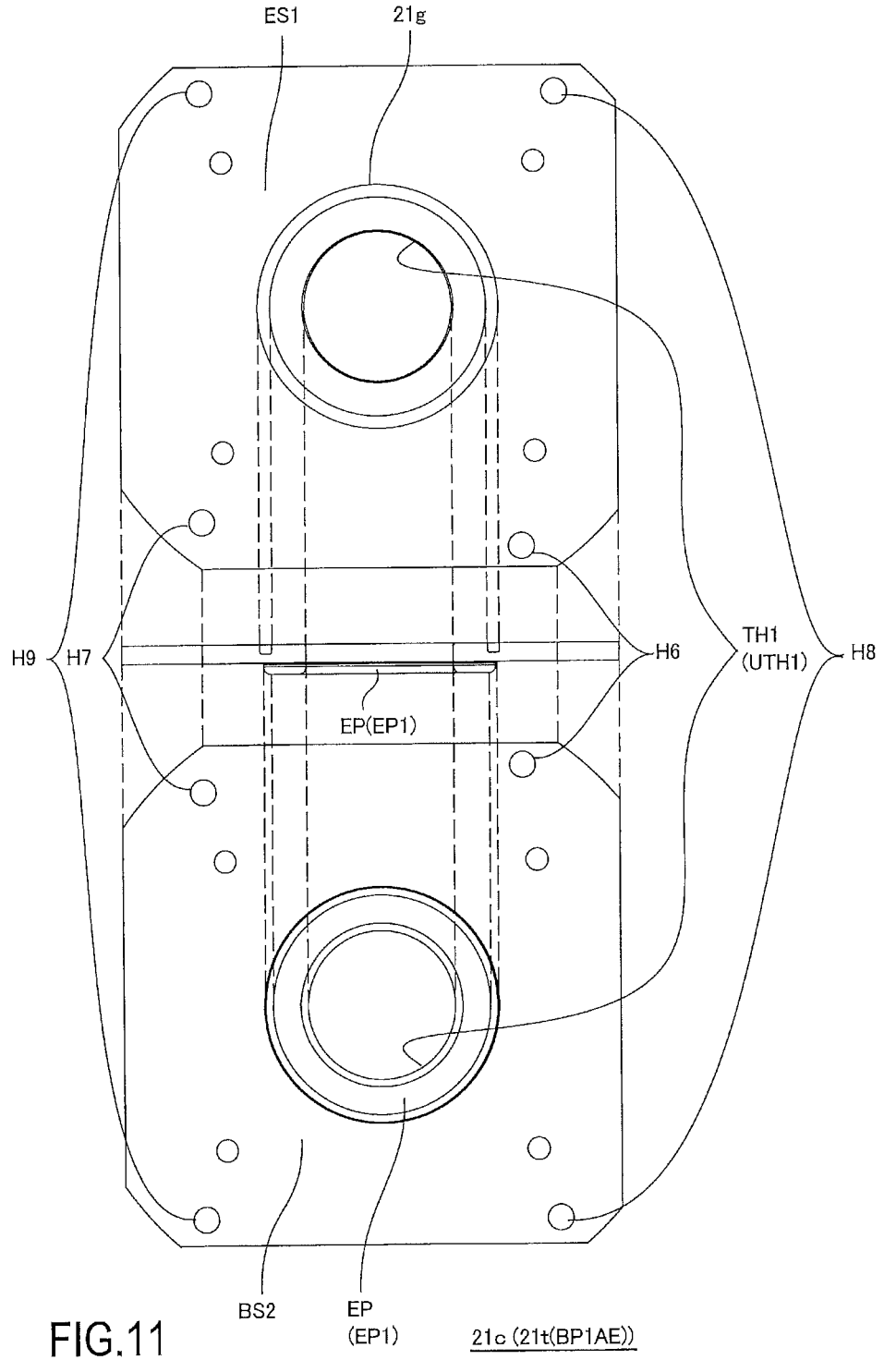
FIG. 11 illustrates a top view, a front view, and a bottom view of a lid member.

Referring to FIG. 10, the upper end 21t of the machining head body 21 (the another end portion BP1AE of the first body BP1) has the first through hole TH1, the first base surface BS1, the second base surface B S2, and the first outer circumferential surface PS1. Referring to FIGS. 8, 10, and 11, the upper end 21t of the machining head body 21 (the another end portion BP1AE of the first body BP1) has a first end surface ES1. When the upper unit 22 (the second body BP2) is connected to the machining head body 21 (the first body BP1), the first end surface ES1 contacts the lower end 22b (the second body end portion BP2E) of the upper unit 22 and is superposed on the first base surface BS1 as viewed from the first optical path extending direction D1. The lower end 22b (the second body end portion BP2E) of the upper unit 22 has the second through hole TH2, the third base surface BS3, the fourth base surface BS4, and the second outer circumferential surface PS2. Referring to FIGS. 9 and 10, the lower end 22b (the second body end portion BP2E) of the upper unit 22 has a second end surface ES2. When the first body BP1 is connected to the second body BP2, the second end surface ES2 contacts the first end surface ES1.

Referring to FIGS. 8 and 10, the laser working machine 1 further has an end surface sealing member ESS. The end surface sealing member ESS is provided between the first end surface ES1 and the second end surface ES2, surrounds the outer circumference of the first through hole TH1 as viewed from the first optical path extending direction D1, and surrounds the outer circumference of the second through hole TH2 as viewed from the second optical path extending direction D2. When the first body BP1 and the second body BP2 are connected to each other, the end surface sealing member ESS seals the gap between the first end surface ES1 and the second end surface ES2. The end surface sealing member ESS has an annular shape, and preferably is an O-ring or a gasket. Referring to FIG. 11, the lid member 21c has the groove 21g, with which the end surface sealing member ESS is engageable. This ensures that even if the laser working machine 1 is used for a long period of time, dust is prevented from entering through the gap between the upper end 21t (the first body BP1) of the machining head body 21 and the lower end 22b (the second body BP2) of the upper unit 22.

Referring to FIG. 10, the upper end 23t of the lower unit 23 (the another end portion BP1AE of the first body BP1) has the first through hole TH1, the first base surface BS1, and the first outer circumferential surface PS1. Referring to FIGS. 5 and 10, the upper end 23t of the lower unit 23 (the another end portion BP1AE of the first body BP1) has the first end surface ES1. When the machining head body 21 (the second body BP2) is connected to the lower unit 23 (the first body BP1), the first end surface ES1 contacts the lower end 21b (the second body end portion BP2E) of the machining head body 21 and makes the first base surface BS1 exposed. Referring to FIGS. 6 and 10, the lower end 21b (the second body end portion BP2E) of the machining head body 21 has the second through hole TH2, the second base surface BS2, the third base surface BS3, the fourth base surface BS4, and the second outer circumferential surface PS2. The lower end 21b (the second body end portion BP2E) of the machining head body 21 has the second end surface ES2. When the first body BP1 is connected to the second body BP2, the second end surface ES2 contacts the first end surface ES1. This makes the structure of the first slot SL1 compact and makes the first slot SL1 and the second slot SL2 smaller in thickness.

Figure 12:
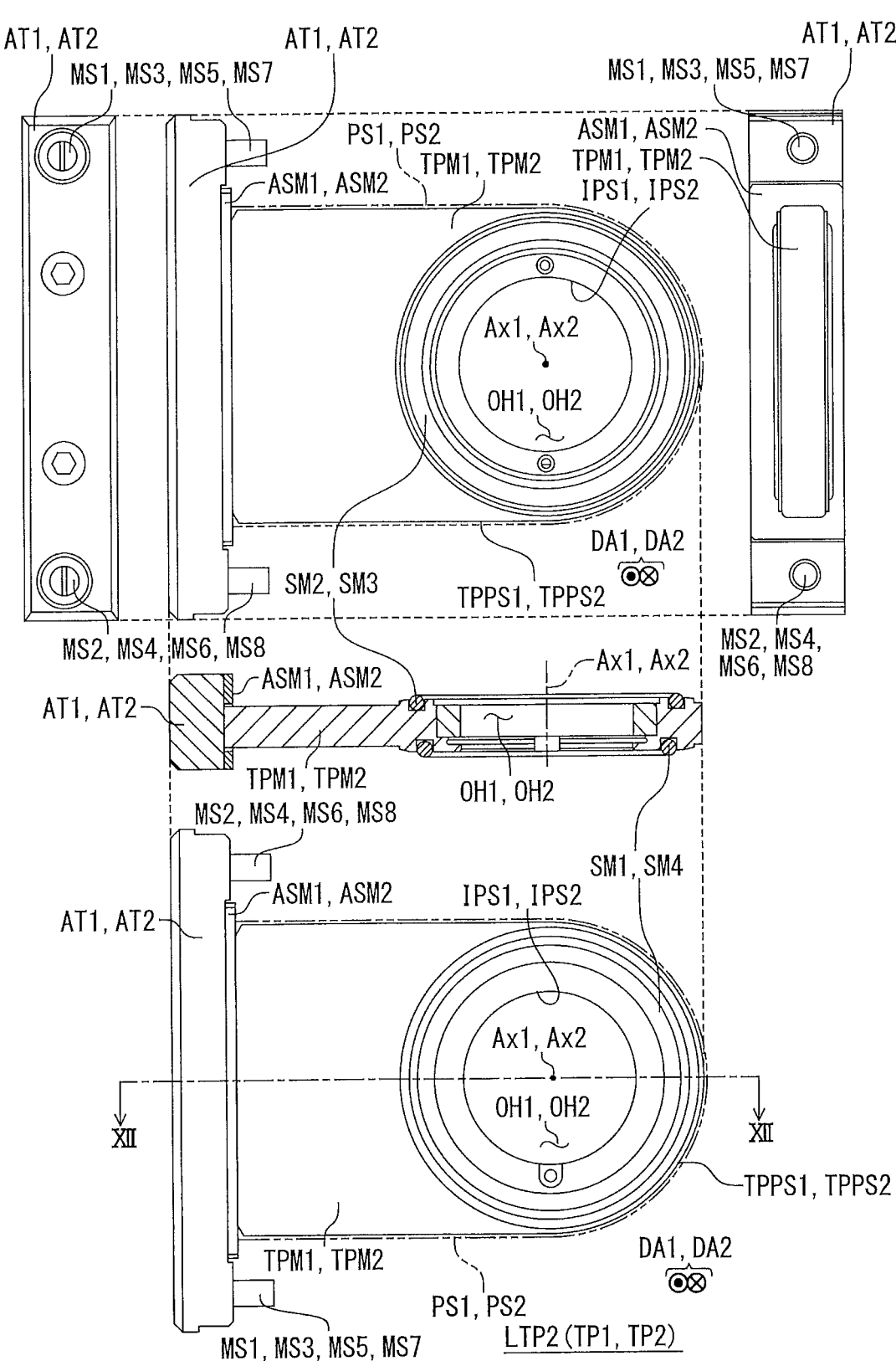
FIG. 12 illustrates a top view of, a bottom view, a left side view, a right side view, and a cross-sectional view of each of a first light transmissive plate and a second light transmissive plate.

Next, the structures of the first light transmissive plate TP1 and the second light transmissive plate TP2 will be described. As described above, the upper first light transmissive plate UTP1, the upper second light transmissive plate UTP2, the lower first light transmissive plate LTP1, and the lower second light transmissive plate LTP2 are identical to each other in structure. In light of this, these plates will be collectively described by referring to FIG. 12. The three figures in the upper area of FIG. 12 are, from left to right, a left side view, a top view, and a right side view of the lower second light transmissive plate LTP2. The figure in the lower area is a bottom view of the lower second light transmissive plate LTP2. The figure in the middle area is a cross-sectional view of the lower second light transmissive plate LTP2 cut along the line XII-XII illustrated in the figure in the lower area.

Referring to FIGS. 10 and 12, the first light transmissive plate TP1 includes a first attachment AT1, a first light transmissive plate body TPM1, a first sealing member SM1, and a second sealing member SM2. The second light transmissive plate TP2 includes a second attachment AT2, a second light transmissive plate body TPM2, a third sealing member SM3, and a fourth sealing member SM4. The first attachment AT1 and the second attachment AT2 are identical to each other in structure. The first light transmissive plate body TPM1 and the second light transmissive plate body TPM2 are identical to each other in structure. The first sealing member SM1 and the third sealing member SM3 are identical to each other in structure. The second sealing member SM2 and the fourth sealing member SM4 are identical to each other in structure. The sealing members SM1 to SM4 are preferably gaskets, but may be O-rings.

The first attachment AT1 is an attachment for mounting the first light transmissive plate TP1 on the another end portion BP1AE of the first body BP1. The first light transmissive plate body TPM1 is connected to the first attachment AT1 and has the first optical path hole OH1. The first sealing member SM1 is mounted on the first light transmissive plate body TPM1 and surrounds the outer circumference of the first optical path hole OH1 as viewed from a first axial direction DA1 of the center axis, Ax1, of the first optical path hole OH1. The first sealing member SM1 is a member for sealing the gap between the first base surface BS1 and the first light transmissive plate body TPM1. The second sealing member SM2 is mounted on the first light transmissive plate body TPM1 and surrounds the outer circumference of the first optical path hole OH1 as viewed from the first axial direction DA1. The second sealing member SM2 is a member for sealing the gap between the second base surface BS2 and the first light transmissive plate body TPM1. The configuration in which the first light transmissive plate TP1 includes the first sealing member SM1 and the second sealing member SM2 reduces the risk of dust entering the first optical path OP1 when the first light transmissive plate TP1 is inserted in the first slot SL1.

The second attachment AT2 is an attachment for mounting the second light transmissive plate TP2 on the second body end portion BP2E. The second light transmissive plate body TPM2 is connected to the second attachment AT2 and has the second optical path hole OH2. The third sealing member SM3 is mounted on the second light transmissive plate body TPM2 and surrounds the outer circumference of the second optical path hole OH2 as viewed from a second axial direction DA2 of the center axis, Ax1, of the second optical path hole OH2. The third sealing member SM3 is a member for sealing the gap between the third base surface BS3 and the second light transmissive plate body TPM2. The fourth sealing member SM4 is mounted on the second light transmissive plate body TPM2 and surrounds the outer circumference of the second optical path hole OH2 as viewed from the second axial direction DA2. The fourth sealing member SM4 is a member for sealing the gap between the fourth base surface BS4 and the second light transmissive plate body TPM2. The configuration in which the second light transmissive plate TP2 includes the third sealing member SM3 and the fourth sealing member SM4 reduces the risk of dust entering the second optical path OP2 when the second light transmissive plate TP2 is inserted in the second slot SL2.

The first light transmissive plate TP1 preferably further includes a first attachment sealing member ASM1. The first attachment sealing member ASM1 is mounted on the first attachment AT1. The first attachment sealing member ASM1 is a member for sealing the gap between the first slot opening SO1 and the first attachment AT1. The first attachment sealing member ASM1 is preferably a gasket. This further reduces the risk of dust entering the first optical path OP1 when the first light transmissive plate TP1 is inserted in the first slot SL1. It is to be noted that the first attachment sealing member ASM1 may be omitted.

The second light transmissive plate TP2 preferably further includes a second attachment sealing member ASM2. The second attachment sealing member ASM2 is mounted on the second attachment AT2. The second attachment sealing member ASM2 is a member for sealing the gap between the second slot opening SO2 and the second attachment AT2. The second attachment sealing member ASM2 is preferably a gasket. This further reduces the risk of dust entering the second optical path OP2 when the second light transmissive plate TP2 is inserted in the second slot SL2. It is to be noted that the second attachment sealing member ASM2 may be omitted.

Further, referring to FIG. 12, the first light transmissive plate body TPM1 has: a first light transmissive plate inner circumferential surface IPS1, which defines the first optical path hole OH1; and a first light transmissive plate outer circumferential surface TPPS1, which is opposite to the first light transmissive plate inner circumferential surface IPS1 in a first radial direction relative to the center axis Ax1 of the first optical path hole OH1. The second light transmissive plate body TPM2 has: a second light transmissive plate inner circumferential surface IPS2, which defines the second optical path hole OH2; and a second light transmissive plate outer circumferential surface TPPS2, which is opposite to the second light transmissive plate inner circumferential surface IPS2 in a second radial direction relative to the center axis Ax2 of the second optical path hole OH2. In FIG. 12, the first outer circumferential surface PS1 facing the first light transmissive plate outer circumferential surface TPPS1 when the first light transmissive plate TP1 is inserted in the first slot SL1 is indicated by a double-dashed line by way of description. Also, the second outer circumferential surface PS2 facing the second light transmissive plate outer circumferential surface TPPS2 when the second light transmissive plate TP2 is inserted in the second slot SL2 is indicated by a double-dashed line by way of description. This configuration ensures that the first light transmissive plate outer circumferential surface TPPS1 is fitted with the first outer circumferential surface PS1. The above configuration also ensures that the second light transmissive plate outer circumferential surface TPPS2 is fitted with the second outer circumferential surface PS2. This decreases the gap between the first light transmissive plate outer circumferential surface TPPS1 and the first outer circumferential surface PS1 and the gap between the second light transmissive plate outer circumferential surface TPPS2 and the second outer circumferential surface PS2, making it difficult for dust to accumulate in the gaps.

Figure 13:
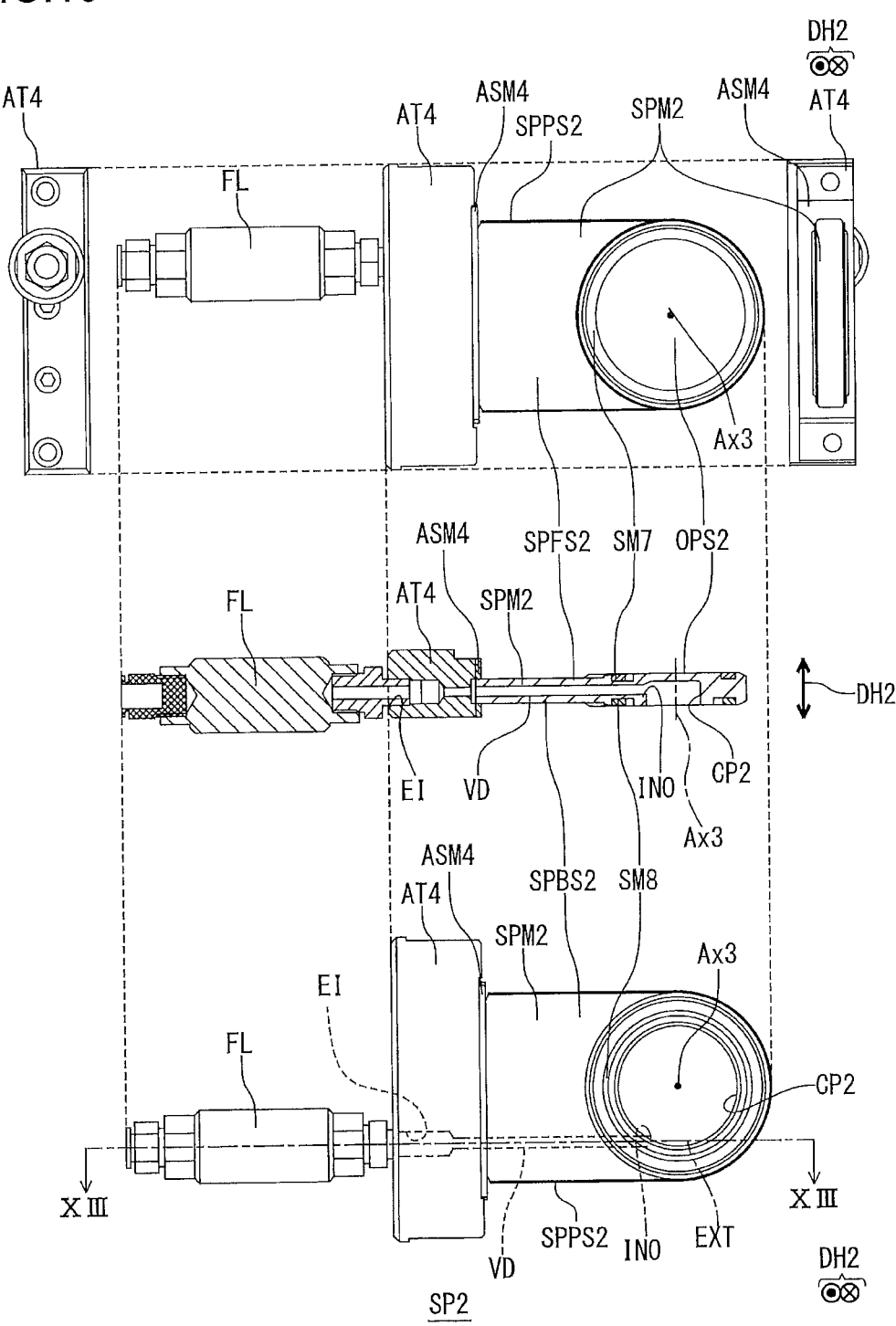
FIG. 13 illustrates a top view of, a bottom view, a left side view, a right side view, and a cross-sectional view of a second shielding plate.

Next, the structures of the first shielding plate SP1 and the second shielding plate SP2 will be described. The three figures in the upper area of FIG. 13 are, from left to right, a left side view, a top view, and a right side view of the second shielding plate SP2. The figure in the lower area is a bottom view of the second shielding plate SP2. The figure in the middle area is a cross-sectional view of the second shielding plate SP2 cut along the line XIII-XIII illustrated in the figure in the lower area. Referring to FIG. 13, the second shielding plate SP2 includes a fourth attachment AT4, a second shielding plate body SPM2, a seventh sealing member SM7, and an eighth sealing member SM8. The fourth attachment AT4 is an attachment for mounting the second shielding plate SP2 on the second body end portion BP2E. The second shielding plate body SPM2 has a second optical path shielding member OP S2, which faces the first inner opening TH2IO1 of the second through hole TH2 in the second optical path extending direction D2 and shields the second optical path OP2 when the second shielding plate SP2 is inserted in the second slot SL2. The second shielding plate body SPM2 is connected to the fourth attachment AT4.

The seventh sealing member SM7 is mounted on the second shielding plate body SPM2 and surrounds the second optical path shielding member OPS2 as viewed from a second thickness direction DH2 of the second shielding plate body SPM2. The seventh sealing member SM7 is a member for sealing the gap between the third base surface BS3 and the second shielding plate body SPM2. The eighth sealing member SM8 is mounted on the second shielding plate body SPM2 and surrounds the second optical path shielding member OPS2 as viewed from the second thickness direction DH2. The eighth sealing member SM8 is a member for sealing the gap between the fourth base surface BS4 and the second shielding plate body SPM2. The seventh sealing member SM7 and the eighth sealing member SM8 are preferably gaskets, but may be O-rings. The configuration in which the second shielding plate SP2 includes the seventh sealing member SM7 and the eighth sealing member SM8 reduces the risk of dust entering the second optical path OP2 when the second shielding plate SP2 is inserted in the second slot SL2.

The second shielding plate SP2 preferably further includes a fourth attachment sealing member ASM4. The fourth attachment sealing member ASM4 is mounted on the fourth attachment AT4. The fourth attachment sealing member ASM4 is a member for sealing the gap between the second slot opening SO2 and the fourth attachment AT4. The fourth attachment sealing member ASM4 is preferably a gasket. This further reduces the risk of dust entering the second optical path OP2 when the second shielding plate SP2 is inserted in the second slot SL2. It is to be noted that the fourth attachment sealing member ASM4 may be omitted.

The second shielding plate body SPM2 has a second shielding plate front surface SPFS2, a second shielding plate back surface SPBS2, and a second shielding plate outer circumferential surface SPPS2. The second shielding plate front surface SPFS2 includes the second optical path shielding member OPS2, and the seventh sealing member SM7 is mounted on the second shielding plate front surface SPFS2. The eighth sealing member SM8 is mounted on the second shielding plate back surface SPBS2. The second shielding plate outer circumferential surface SPPS2 connects the second shielding plate front surface SPFS2 and the second shielding plate back surface SPBS2 to each other. Referring to FIGS. 6 and 9, the second shielding plate outer circumferential surface SPPS2 is fitted with the second outer circumferential surface PS2. This decreases the gap between the second shielding plate outer circumferential surface SPPS2 and the second outer circumferential surface PS2, making it difficult for dust to accumulate in the gap.

Figure 14:
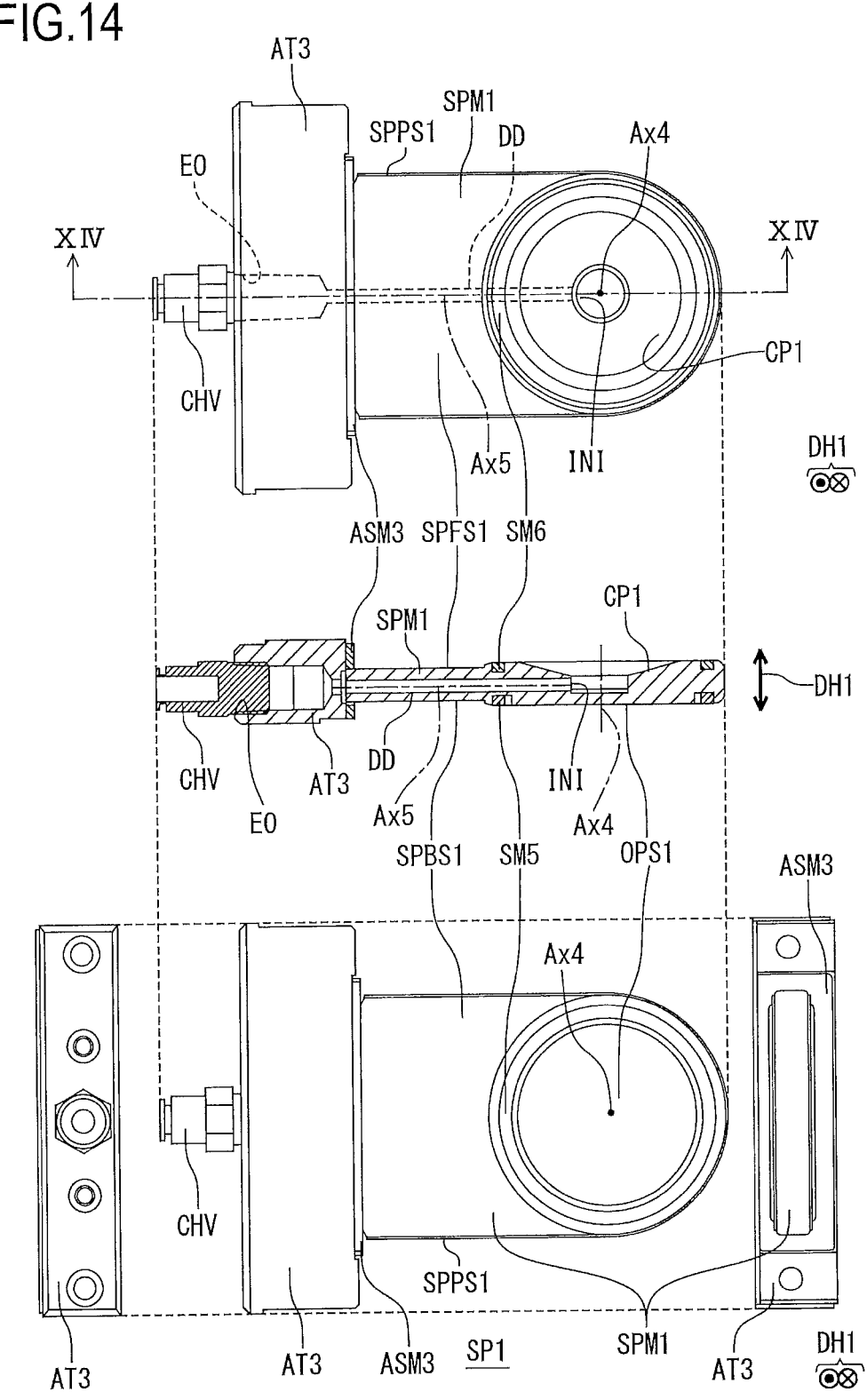
FIG. 14 illustrates a top view of, a bottom view, a left side view, a right side view, and a cross-sectional view of a first shielding plate.

The three figures in the lower area of FIG. 14 are, from left to right, a left side view, a bottom view, and a right side view of the first shielding plate SP1. The figure in the upper area is a top view of the first shielding plate SP1. The figure in the middle area is a cross-sectional view of the first shielding plate SP1 cut along the line XIV-XIV illustrated in the figure in the upper area. Referring to FIG. 14, the first shielding plate SP1 includes a third attachment AT3, a first shielding plate body SPM1, a fifth sealing member SM5, and a sixth sealing member SM6. The third attachment AT3 is an attachment for mounting the first shielding plate SP1 on the another end portion BP1AE of the first body BP1. The first shielding plate body SPM1 includes a first optical path shielding member OPS1, which faces the inner opening TH1IO of the first through hole TH1 in the first optical path extending direction D1 and is configured to block the first optical path OP1 when the first shielding plate SP1 is inserted in the first slot SL1. The first shielding plate body SPM1 is connected to the third attachment AT3.

The fifth sealing member SM5 is mounted on the first shielding plate body SPM1 and surrounds the first optical path shielding member OPS1 as viewed from a first thickness direction DH1 of the first shielding plate body SPM1. The fifth sealing member SM5 is a member for sealing the gap between the first base surface BS1 and the first shielding plate body SPM1. The sixth sealing member SM6 is mounted on the first shielding plate body SPM1 and surrounds the first optical path shielding member OPS1 as viewed from the first thickness direction DH1. The sixth sealing member SM6 is a member for sealing the gap between the second base surface BS2 and the second shielding plate body SPM2. The fifth sealing member SM5 and the sixth sealing member SM6 are preferably gaskets, but may be O-rings. The configuration in which the first shielding plate SP1 includes the fifth sealing member SM5 and the sixth sealing member SM6 reduces the risk of dust entering the first optical path OP1 when the first shielding plate SP1 is inserted in the first slot SL1.

The first shielding plate SP1 preferably further includes a third attachment sealing member ASM3. The third attachment sealing member ASM3 is mounted on the third attachment AT3. The third attachment sealing member ASM3 is a member for sealing the gap between the first slot opening SO1 and the third attachment AT3. The third attachment sealing member ASM3 is preferably a gasket. This further reduces the risk of dust entering the first optical path OP1 when the first shielding plate SP1 is inserted in the first slot SL1. It is to be noted that the third attachment sealing member ASM3 may be omitted.

The first shielding plate body SPM1 has a first shielding plate front surface SPFS1, a first shielding plate back surface SPBS1, and a first shielding plate outer circumferential surface SPPS1. The first shielding plate back surface SPBS1 includes the first optical path shielding member OPS1, and the fifth sealing member SM5 is mounted on the first shielding plate back surface SPBS1. The sixth sealing member SM6 is mounted on the first shielding plate front surface SPFS1. The first shielding plate outer circumferential surface SPPS1 connects the first shielding plate front surface SPFS1 and the first shielding plate back surface SPBS1 to each other. Referring to FIGS. 5 and 8, the first shielding plate outer circumferential surface SPPS1 is fitted with the first outer circumferential surface PS1. This decreases the gap between the first shielding plate outer circumferential surface SPPS1 and the first outer circumferential surface PS1, making it difficult for dust to accumulate in the gap.

The first shielding plate SP1 and the second shielding plate SP2 according to this embodiment ensure that when the upper unit 22 or the lower unit 23 is attached to the machining head body 21, a shielded space SS, which is surrounded by the first shielding plate SP1, the second shielding plate SP2, the first body BP1, and the second body BP2, can be cleaned. This further reduces the risk of dust entering the first optical path OP1 and the second optical path OP2 when the first shielding plate SP1 and the second shielding plate SP2 are respectively replaced with the first light transmissive plate TP1 and the second light transmissive plate TP2.

Figure 15:
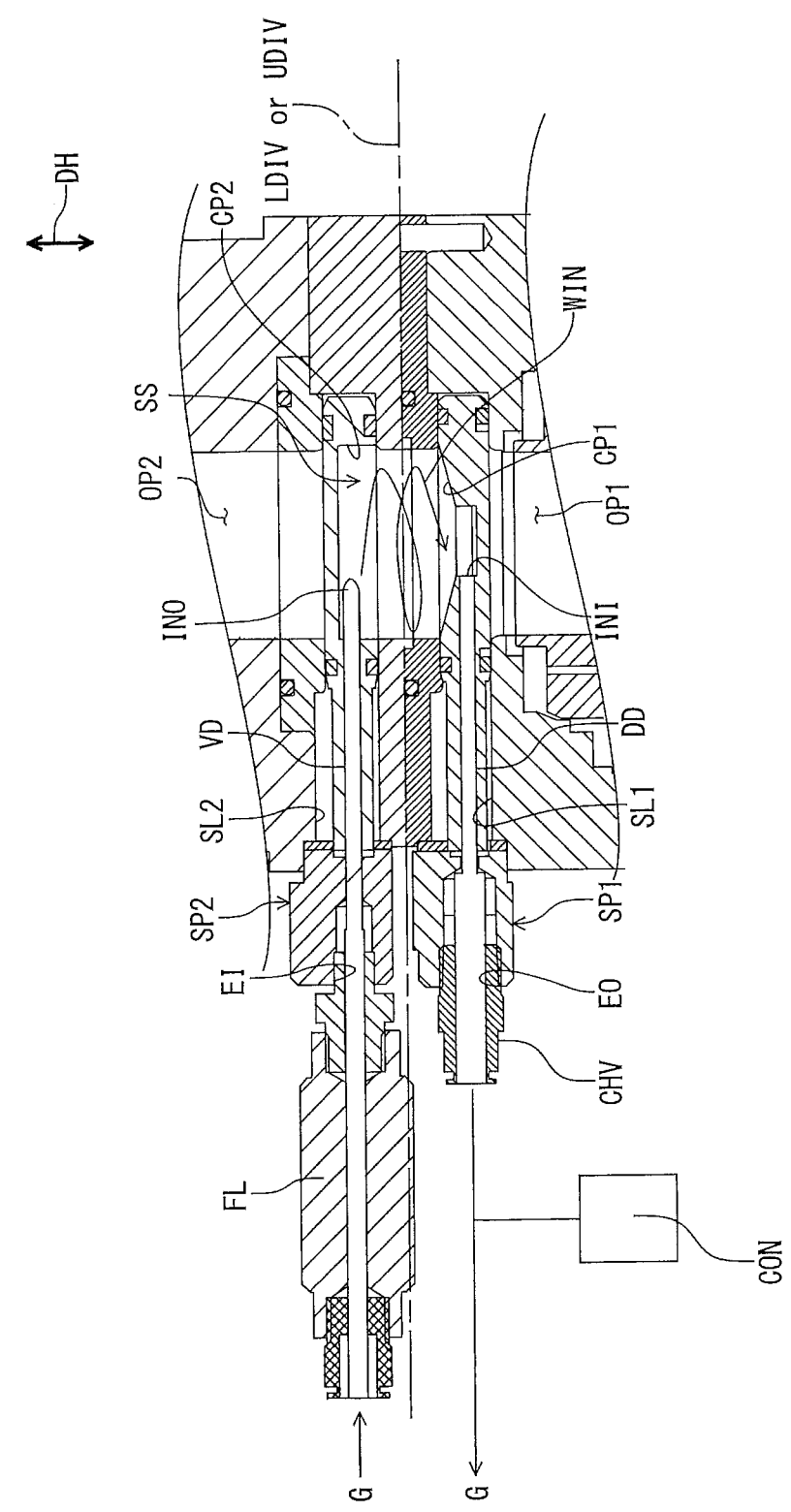
FIG. 15 illustrates a method for cleaning a shielded space defined by a shielding plate with the upper unit or the lower unit mounted on the machining head body.

In order to realize this effect, one shielding plate that is either the first shielding plate SP1 or the second shielding plate SP2 includes a ventilating duct VD, as illustrated in FIG. 15. Through the ventilating duct VD, gas G is sent to the shielded space SS, which is surrounded by the first shielding plate SP1, the second shielding plate SP2, the first body BP1, and the second body BP2. Another shielding plate that is either the first shielding plate SP1 or the second shielding plate SP2 includes a discharge duct DD, through which the gas G is discharged out of the shielded space SS. In this embodiment, the second slot SL2 is provided above the first slot the height direction, DH (A-axis direction and Z-axis direction), of the laser working machine 1. Considering that dust has a property of falling, the above configuration is preferably such that the one shielding plate is the second shielding plate SP2 and the another shielding plate is the first shielding plate SP1. In light of this, the following description of the embodiment will be provided under the assumption that the second shielding plate SP2 includes the ventilating duct VD and the first shielding plate SP1 includes the discharge duct DD. However, since it is technically possible to make an upward blow of dust, the configuration of the first shielding plate SP1 in the following description may instead be the configuration of the second shielding plate SP2, and the configuration of the second shielding plate SP2 in the following description may instead be the configuration of the first shielding plate SP1.

Referring to FIGS. 13 and 15, one attachment that is either the third attachment AT3 or the fourth attachment AT4 (AT4 in FIGS. 13 and 15) and that is provided at one shielding plate that is either the first shielding plate SP1 or the second shielding plate SP2 (SP2 in FIGS. 13 and 15) has an external inlet EI, through which gas is sent. It is to be noted that the one shielding plate (SP2 in FIGS. 13 and 15) preferably further includes a filter FL, which is connected to the external inlet EI and through which the gas G is purified. This reduces the risk of impurity-contaminated gas being sent to the shielded space SS.

One shielding plate body that is either the first shielding plate body SPM1 or the second shielding plate body SPM2 (SPM2 in FIGS. 13 and 15) and that is provided at the one shielding plate has an internal outlet INO and the ventilating duct VD. The internal outlet INO is provided at a position opposite in one height direction to one optical path shielding member that is either the first optical path shielding member OPS1 or the second optical path shielding member OPS2 (OPS2 in FIGS. 13 and 15) and that is provided at the one shielding plate body. The one height direction is either the first thickness direction DH1 or the second thickness direction DH2 (DH2 in FIGS. 13 and 15) and is the height direction of the one shielding plate body. The ventilating duct VD extends from the external inlet EI toward the internal outlet INO.

The one shielding plate body (SPM2 in FIGS. 13 and 15) has a second depression CP2. The second depression CP2 has a substantially circular cylindrical shape and is provided at a position opposite in the thickness direction to the optical path shielding member (OPS2 in FIGS. 13 and 15) provided at the one shielding plate body. The thickness direction is the thickness direction (DH2 in FIGS. 13 and 15) of the one shielding plate body. The internal outlet INO is provided at a side surface of the substantially circular cylindrical shape. Referring to the lower area of FIG. 13, at the inside of the second depression CP2, an extension line EXT of the center axis of the ventilating duct VD is displaced from the center axis, Ax3, of the substantially circular cylindrical shape. In this configuration, the gas discharged from the ventilating duct VD flows along the side surface of the substantially circular cylindrical shape, resulting in a swirl of air WIN illustrated in FIG. 15. This ensures that the air WIN discharged from the ventilating duct VD reaches the entirety of the shielded space SS, making impurities discharged efficiently. Further, the extension line EXT extends along the side surface of the substantially circular cylindrical shape near the internal outlet INO. This ensures that a large swirl of air WIN is generated, making impurities discharged more efficiently.

Referring to FIGS. 14 and 15, another attachment that is either the third attachment AT3 or the fourth attachment AT4 (AT3 in FIGS. 14 and 15) and that is provided at another shielding plate that is either the first shielding plate SP1 or the second shielding plate SP2 (SP1 in FIGS. 14 and 15) has an external outlet EO, through which the gas G is discharged. Another shielding plate body that is either the first shielding plate body SPM1 or the second shielding plate body SPM2 (SPM1 in FIGS. 14 and 15) and that is provided at the another shielding plate has an internal inlet INI and the discharge duct DD. The internal inlet INI is provided at a position opposite in another height direction to another optical path shielding member that is either the first optical path shielding member OPS1 or the second optical path shielding member OPS2 (OPS1 in FIGS. 13 and 15) and that is provided at the another shielding plate body. The another height direction is either the first thickness direction DH1 or the second thickness direction DH2 (DH1 in FIGS. 14 and 15) and is the height direction of the another shielding plate body. The discharge duct DD extends from the internal inlet INI toward the external outlet EO.

As illustrated in FIG. 15, the another shielding plate (SP1 in FIGS. 14 and 15) preferably further includes a particle counter CON, which is connected to the external outlet EO and measures impurities contaminating the gas G. This makes it possible to check whether impurities have been discharged out of the shielded space SS. Further as illustrated in FIGS. 14 and 15, the another shielding plate (SP1 in FIGS. 14 and 15) preferably further includes a check valve CHV, which is connected to the external outlet EO. This prevents impurities from flowing inversely and entering the shielded space SS through the external outlet EO when the gas G supply from the ventilating duct VD is stopped.

Further, referring to FIGS. 14 and 15, the another shielding plate body (SPM1 in FIGS. 14 and 15) has a first depression CP1. The first depression CP1 has a substantially inverse truncated cone shape with the internal inlet INI serving as the bottom of the substantially inverse truncated cone shape. The first depression CP1 is provided at a position opposite, in the thickness direction of the another shielding plate body (DH1 in FIGS. 14 and 15), to the optical path shielding member (OPS1 in FIGS. 14 and 15) provided at the another shielding plate body. Also, the center axis, Ax5, of the discharge duct DD extends toward the center axis, Ax4, of the substantially inverse truncated cone shape. This ensures that impurities carried by the air WIN are efficiently collected at the internal inlet INI, as illustrated in FIG. 15, making the impurities discharged efficiently.

<Method for Maintaining Laser Working Machine 1>

Figure 16:
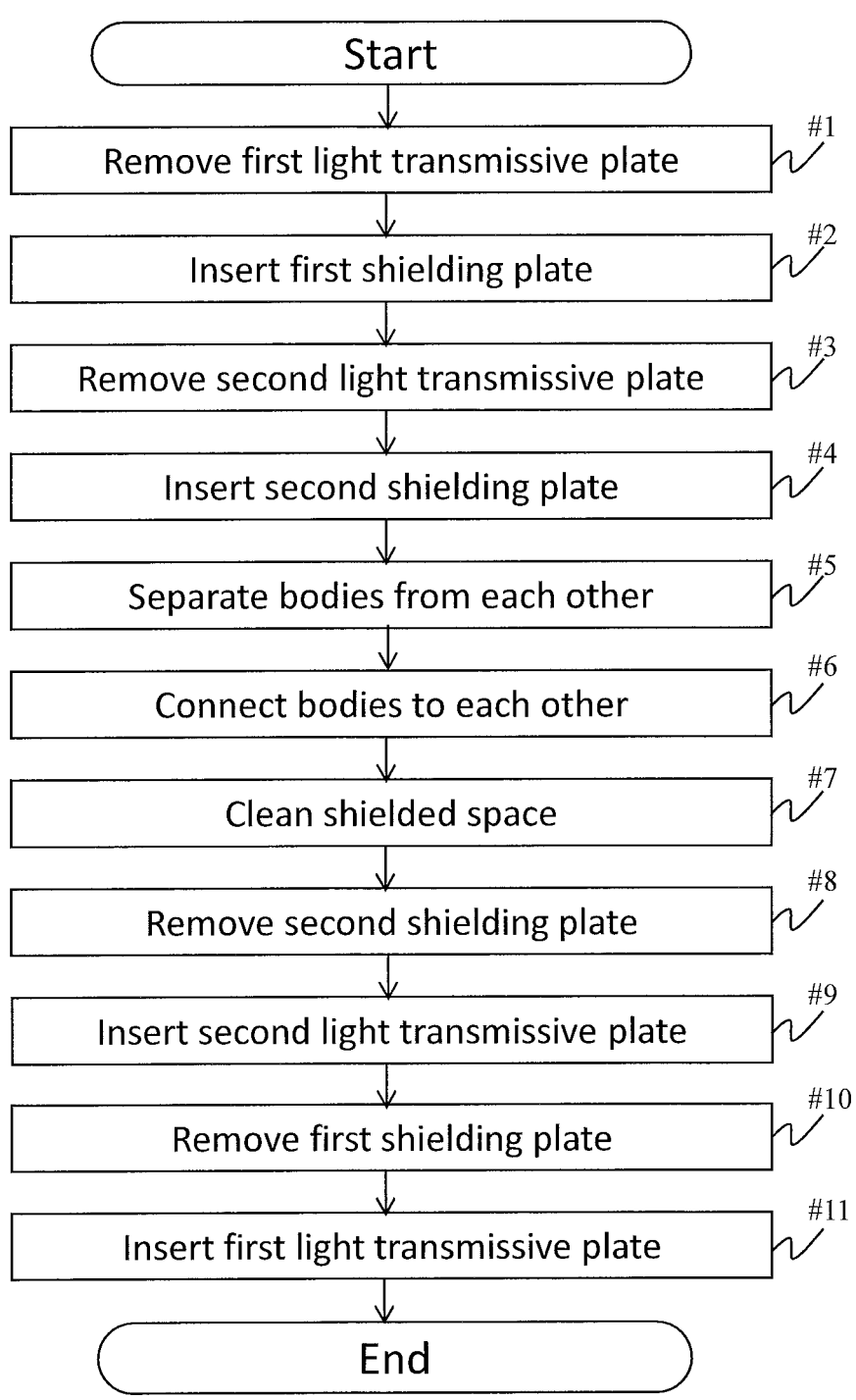
FIG. 16 is a flowchart of a method according to an embodiment of the present application for maintaining a laser working machine.

Next, the method according to this embodiment for maintaining the laser working machine 1 will be described. FIG. 16 is a flowchart of processing performed in the method for maintaining in a case where maintenance is performed with only one of the upper unit 22 and the lower unit 23 removed from the machining head body 21. A prerequisite for the method for maintaining is that the laser working machine 1 includes: the first body BP1, which has the first optical path OP1, through which laser light passes; and the second body BP2, which includes the second optical path OP2, which is positioned above the first body BP1 and through which laser light passes. Another prerequisite is that pressurized gas is supplied from a position above the second body BP2 to the inside of the first body BP1 and the second body BP2.

At step #1, the first light transmissive plate TP1 is inserted into the first slot SL1 of the first body BP1. The first light transmissive plate TP1 has the first optical path hole OH1, through which the first optical path OP1 passes. The second light transmissive plate TP2 is inserted into the second slot SL2 of the second body BP2. The second light transmissive plate TP2 has the second optical path hole OH2, through which the second optical path OP2 passes. With the plates in this state, the first light transmissive plate TP1 is removed. As described above, the internal pressure of the gas in the first body BP1 and in the second body BP2 is higher than the external pressure of the air around the first body BP1 and around the second body BP2. This ensures that even though the first light transmissive plate TP1 is removed, the gas in the laser working machine 1 gushes out of the first slot SL1 of the first body BP1, to the space around the first body BP1. This minimizes the risk of dust entering the laser working machine 1 through the open first slot SL1.

At step #2, the first shielding plate SP1, which is configured to block the first optical path OP1, is inserted into the first slot SL1. At step #3, the second light transmissive plate TP2 is removed from the second slot SL2. In this case as well, pressurized gas is supplied from the upper unit 22 to the second slot SL2 of the second body BP2, making the gas gush out of the second slot SL2 of the second body BP2, to the space around the second slot SL2 of the second body BP2. This prevents dust from entering the laser working machine 1 through the open second slot SL2. At step #4, the second shielding plate SP2, which is for shielding the second optical path OP2, is inserted into the second slot SL2. At step #5, the first body BP1 and the second body BP2 are separated from each other for purposes of maintenance work of at least one of the first body BP1 and the second body BP2. At step #6, the first shielding plate SP1 is inserted into the first slot SL1, and the second shielding plate SP2 is inserted into the second slot SL2. With the plates in this state, the first body BP1 and the second body BP2 are brought into connection to each other.

At step #7, as illustrated in FIG. 15, the gas G is sent through the ventilating duct VD of the second shielding plate SP2 to the shielded space SS, which is defined between the first shielding plate SP1 and the second shielding plate SP2; and the gas G is discharged from the shielded space SS through the discharge duct DD of the first shielding plate SP1. This causes the impurities in the shielded space SS to be discharged out of the laser working machine 1. At step #8, the second shielding plate SP2 is removed from the second slot SL2. For the same reason mentioned in the description of step #3, there is a minimized risk of dust entering the laser working machine 1 through the open second slot SL2. At step #9, the second light transmissive plate TP2 is inserted into the second slot SL2. At step #10, the first shielding plate SP1 is removed from the first slot SL1. For the same reason mentioned in the description of step #1, there is a minimized risk of dust entering the laser working machine 1 through the open first slot SL1. At step #11, the first light transmissive plate TP1 is inserted into the first slot SL1.

FIG. 17 is a flowchart of processing performed in the method for maintaining in a case where maintenance is performed with the upper unit 22 and the lower unit 23 simultaneously removed from the machining head body 21. In FIGS. 17 and 16, similar or identical processings will be assigned the same reference numerals and/or symbols, and will not be elaborated upon here. Steps #1 to #4 illustrated in FIG. 17 are steps of replacing the light transmissive plates in the lower first slot LSL1 and the lower second slot LSL2 with shielding plates. At additional steps #21 to #24, processings similar to the processings performed at steps #1 to #4 illustrated in FIG. 16 are performed with respect to the upper first slot USL1 and the upper second slot USL2. Next, step #25 is performed between step #6 and step #7. At step #25, the intervening two shielding plates are replaced with light transmissive plates. Specifically, at the lower second slot LSL2 and the upper first slot USL1, the shielding plates are replaced with light transmissive plates. At steps #8 and #9, at the upper second slot USL2, the second shielding plate SP2 is replaced with the second light transmissive plate TP2. At steps #10 and #11, at the lower first slot LSL1, the first shielding plate SP1 is replaced with the first light transmissive plate TP1.

As in FIGS. 16 and 17, the lower light transmissive plate is replaced with a shielding plate first, and at the attachment time, the upper shielding plate is replaced with a light transmissive plate first. This ensures that the gas in the laser working machine 1 gushes out through the slot that is temporarily open for replacement purposes, preventing dust from entering the laser working machine 1 through the open slot SL2.

<Modifications of Laser Working Machine 1>

A basic description of the laser working machine 1 has been provided hereinbefore. It is to be noted that the divided portions associated with the first slot SL1 and the second slot SL2 will not be limited to those described in the above embodiment. The divided portions may be provided at any other positions in front of or behind the optical element provided along the optical path of laser light.

The above embodiment illustrates an example in which the second shielding plate SP2 sends gas to the shielded space SS. It is also possible to send the gas in the laser working machine 1 to the shielded space SS so as to discharge impurities out of the shielded space SS. This can be realized by an example configuration in which the first shielding plate SP1 has the same structure as the structure of the first shielding plate SP1 according to the above embodiment and in which the second shielding plate SP2 is partially open toward the second body BP2.

Figure 18:
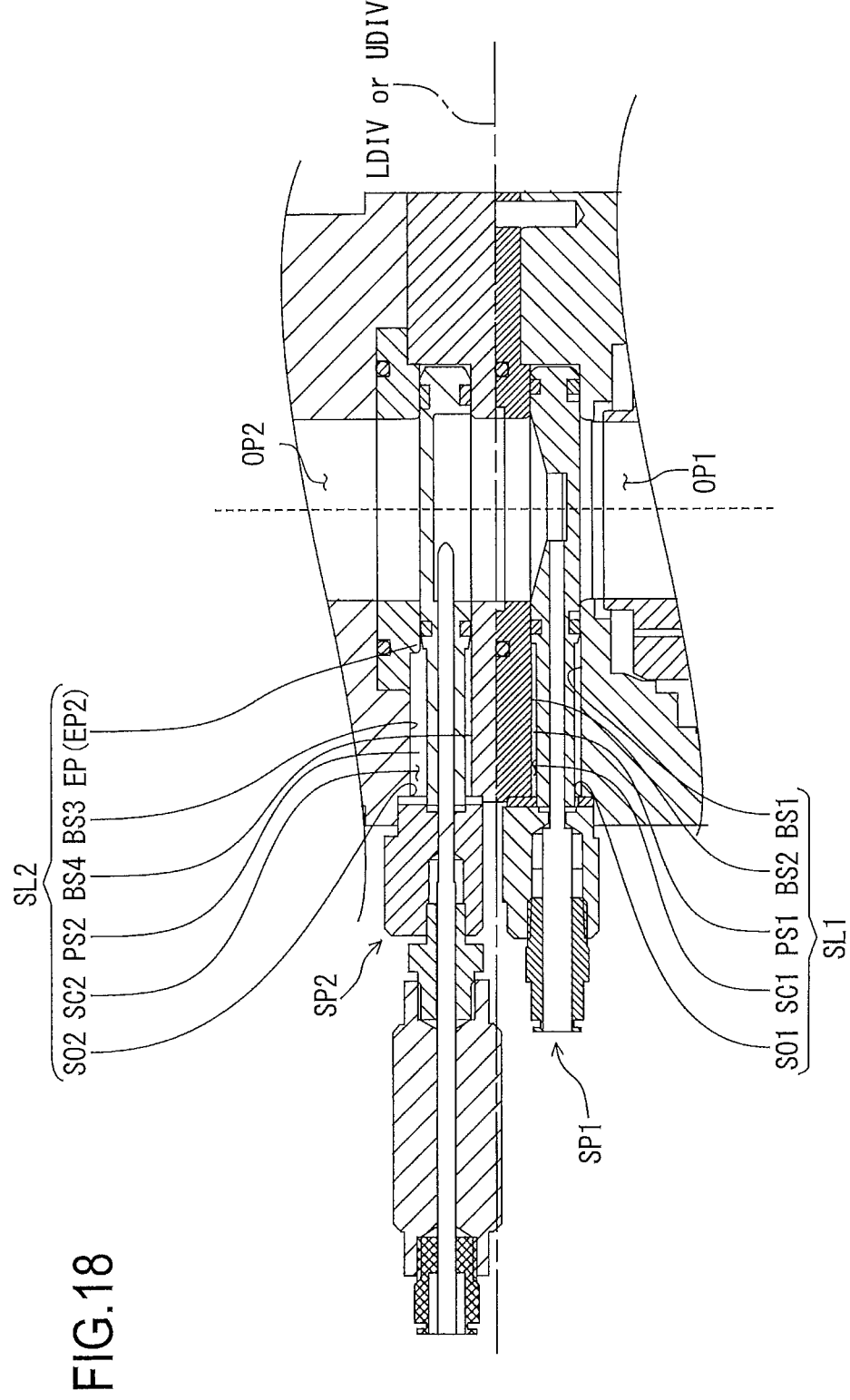
FIG. 18 illustrates a modification associated with the shapes of a first slot and a second slot.
Figure 19:
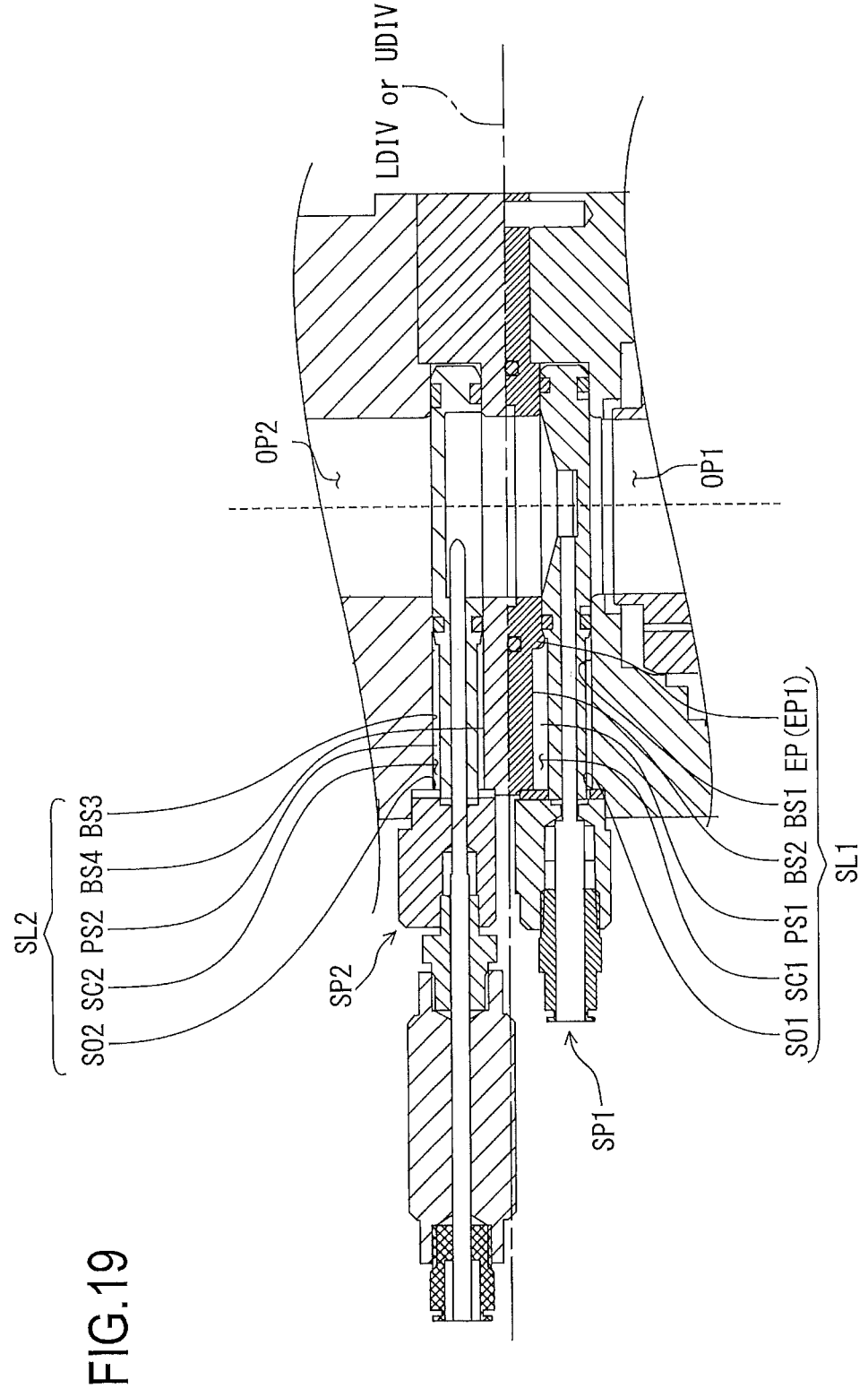
FIG. 19 illustrates a modification associated with the shapes of the first slot and the second slot.
Figure 20:
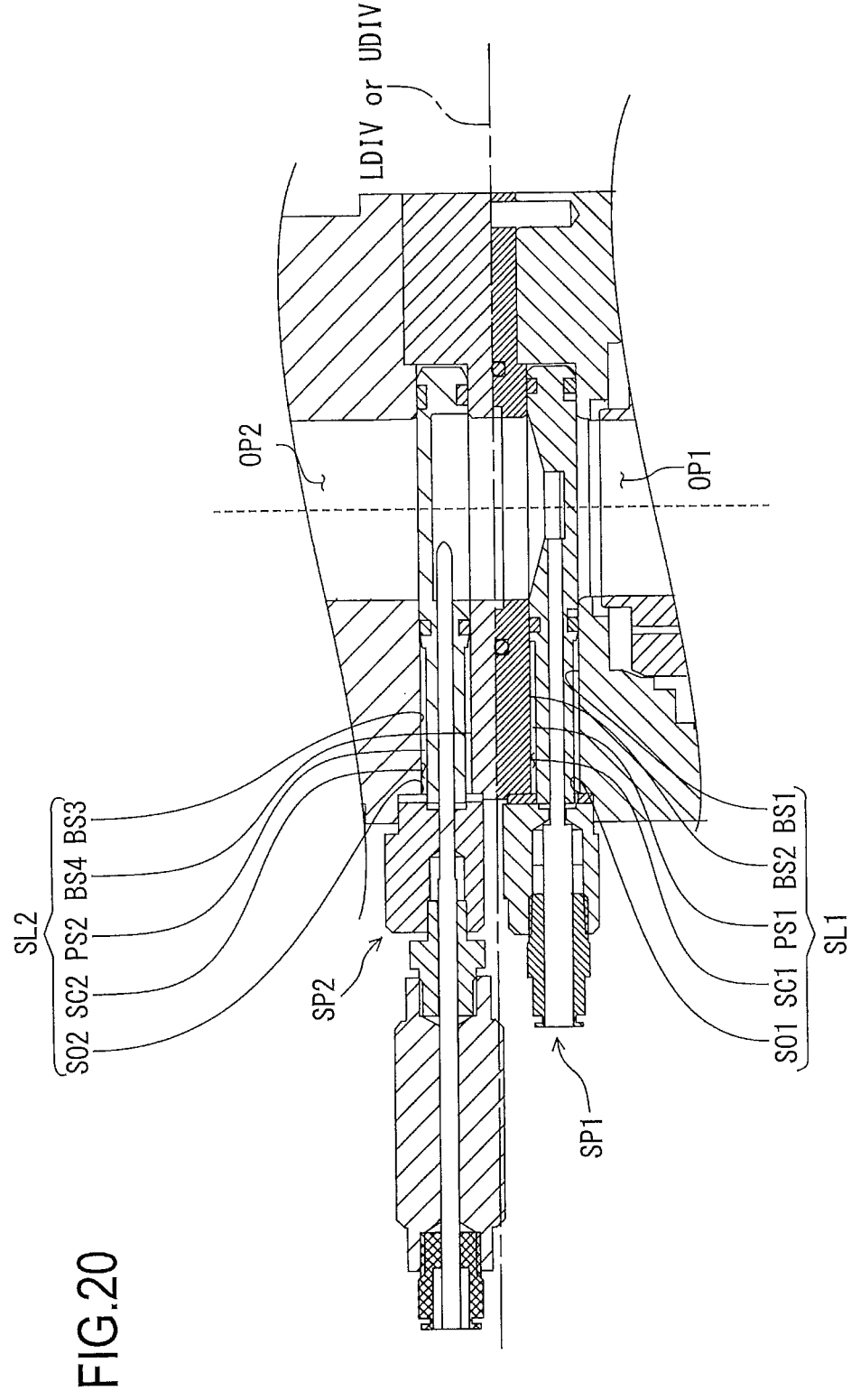
FIG. 20 illustrates a modification associated with the shapes of the first slot and the second slot.
Figure 21:
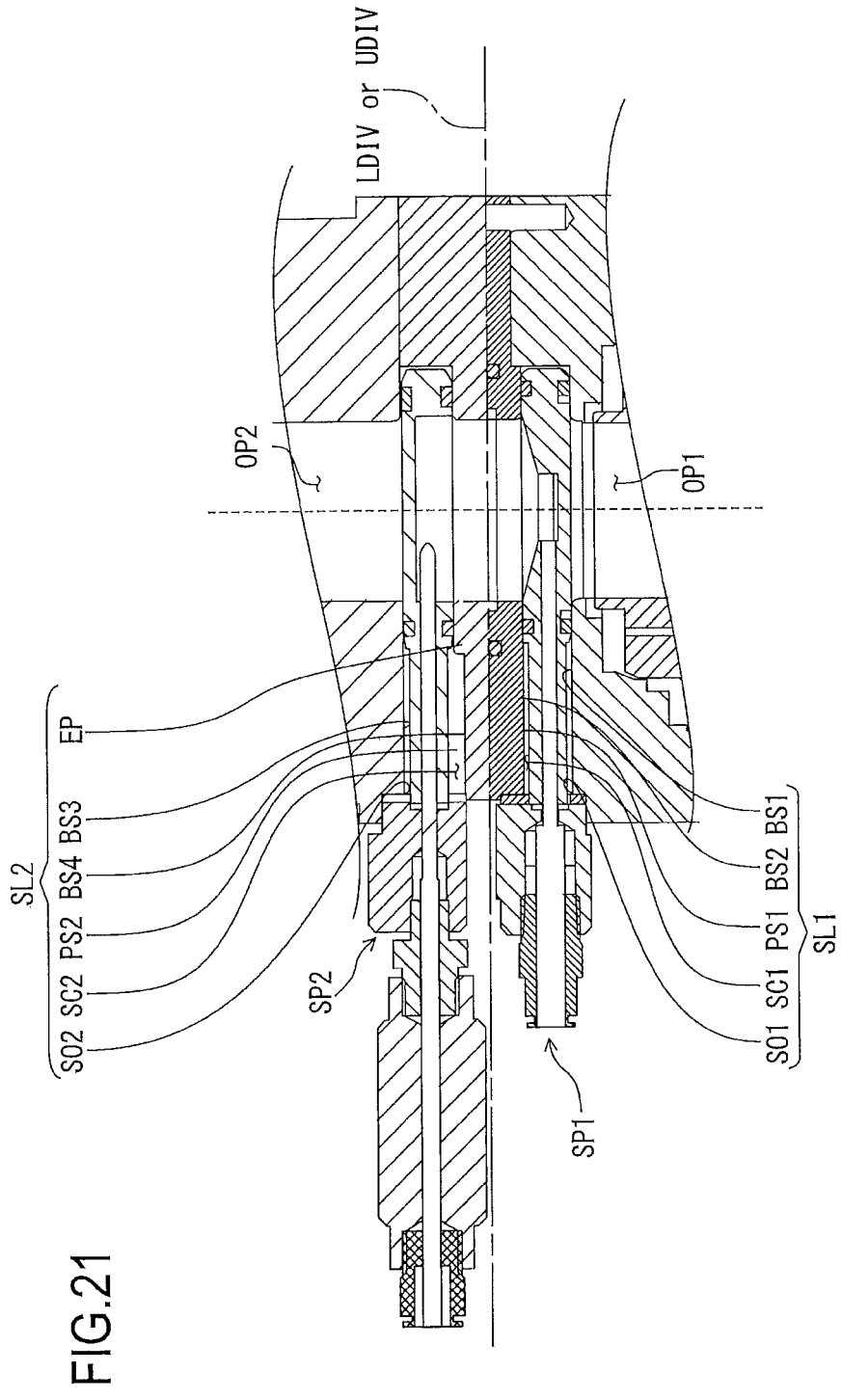
FIG. 21 illustrates a modification associated with the shapes of the first slot and the second slot.
Figure 22:
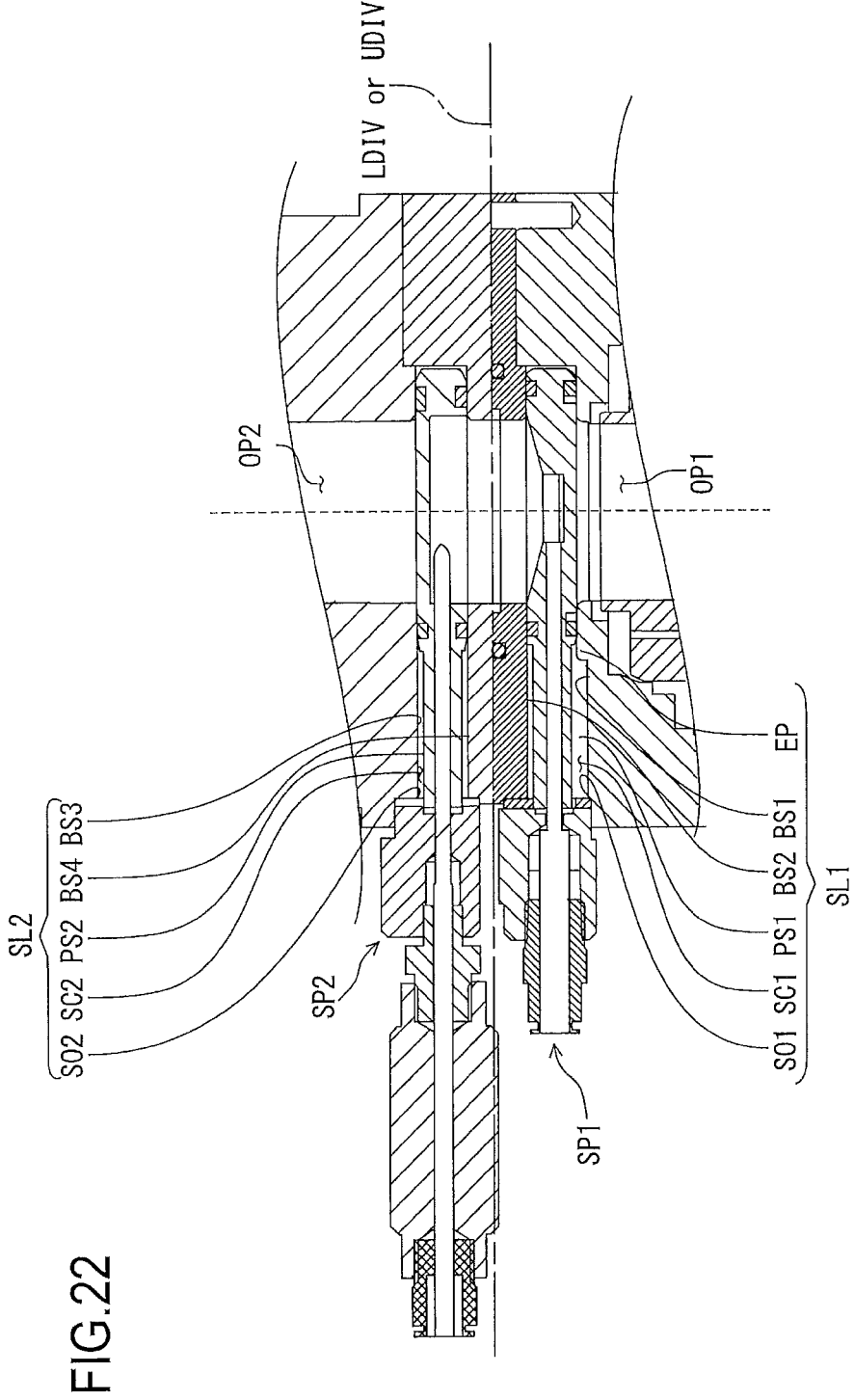
FIG. 22 illustrates a modification associated with the shapes of the first slot and the second slot.
Figure 23:
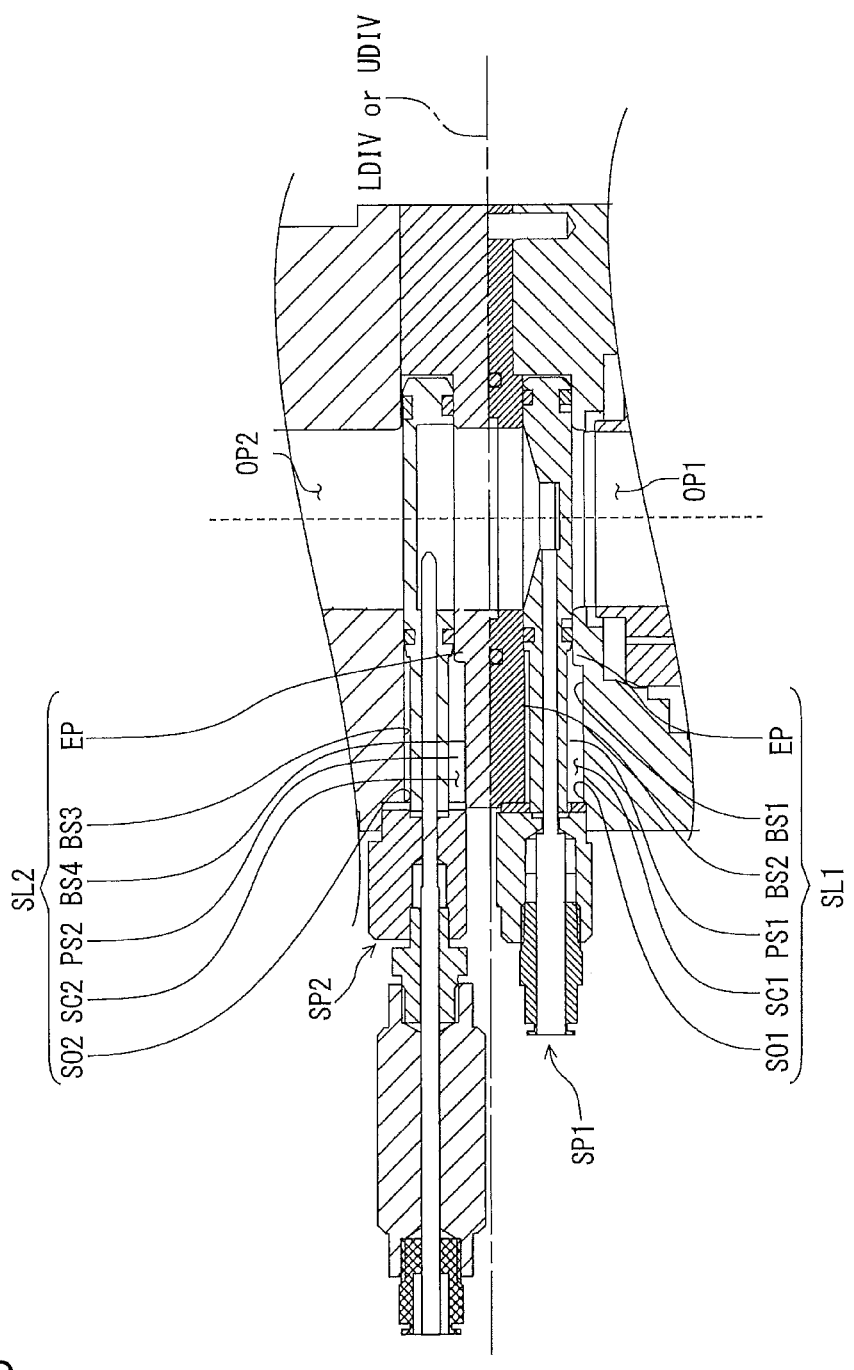
FIG. 23 illustrates a modification associated with the shapes of the first slot and the second slot.
Figure 24:
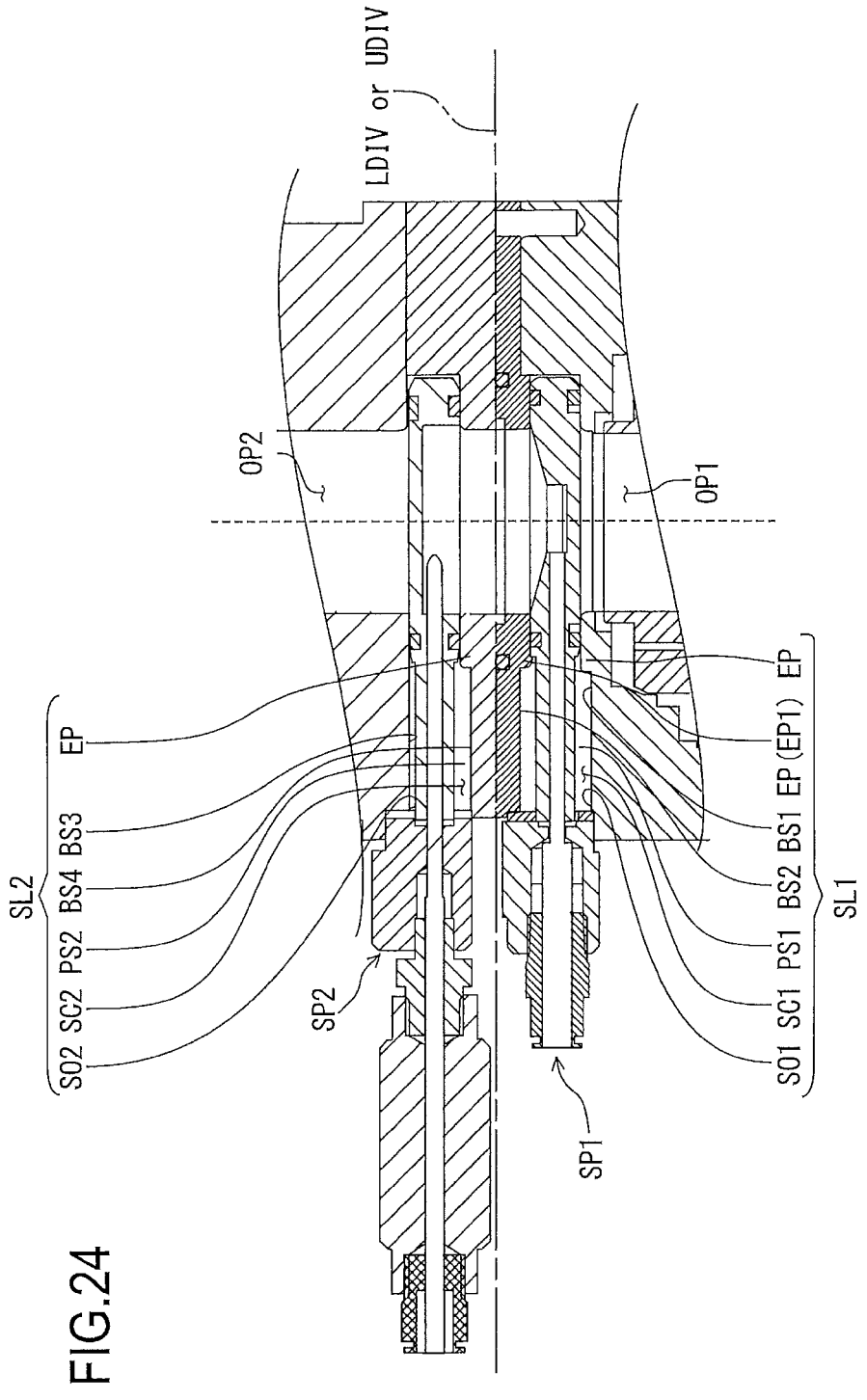
FIG. 24 illustrates a modification associated with the shapes of the first slot and the second slot.
Figure 25:
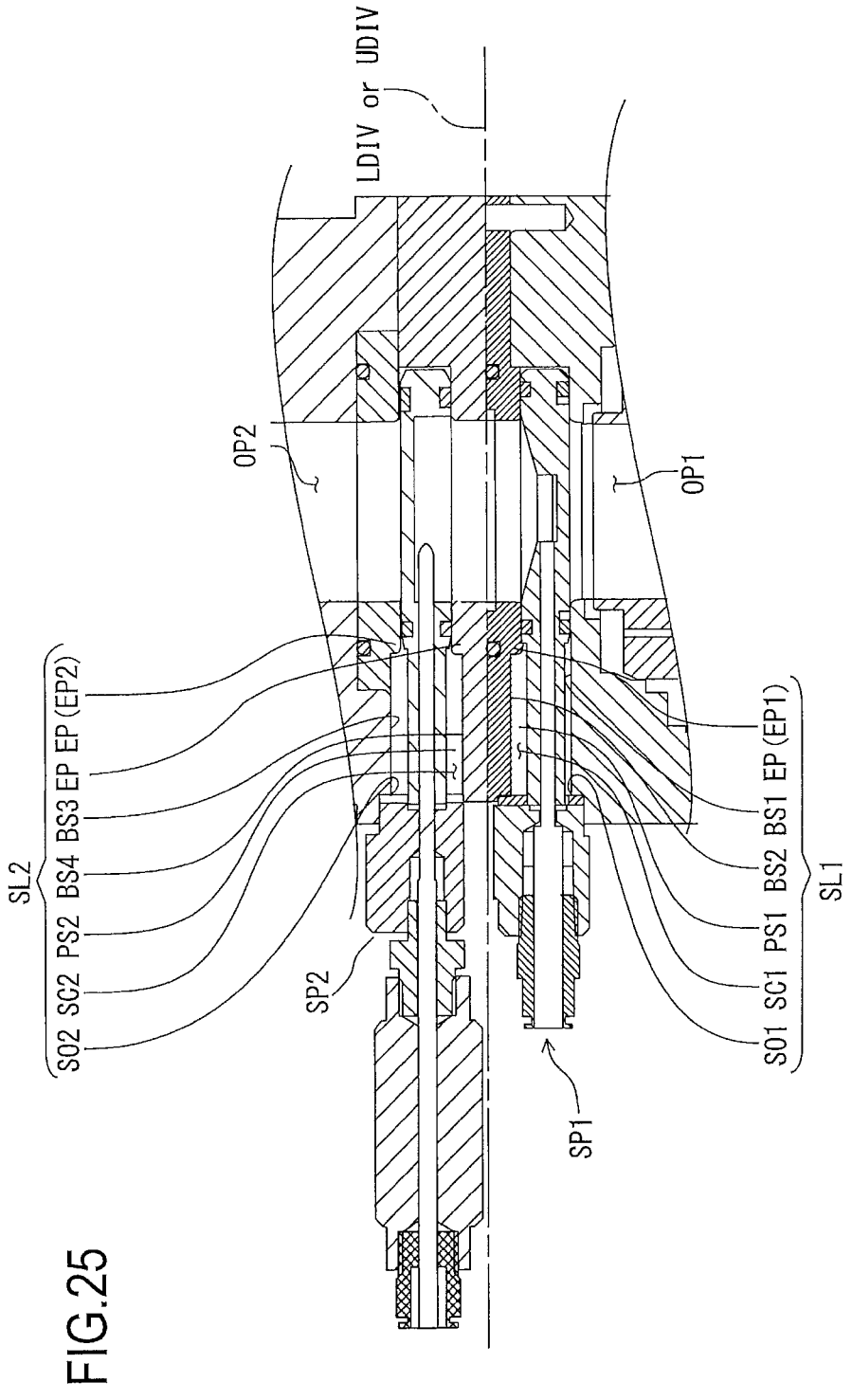
FIG. 25 illustrates a modification associated with the shapes of the first slot and the second slot.
Figure 26:
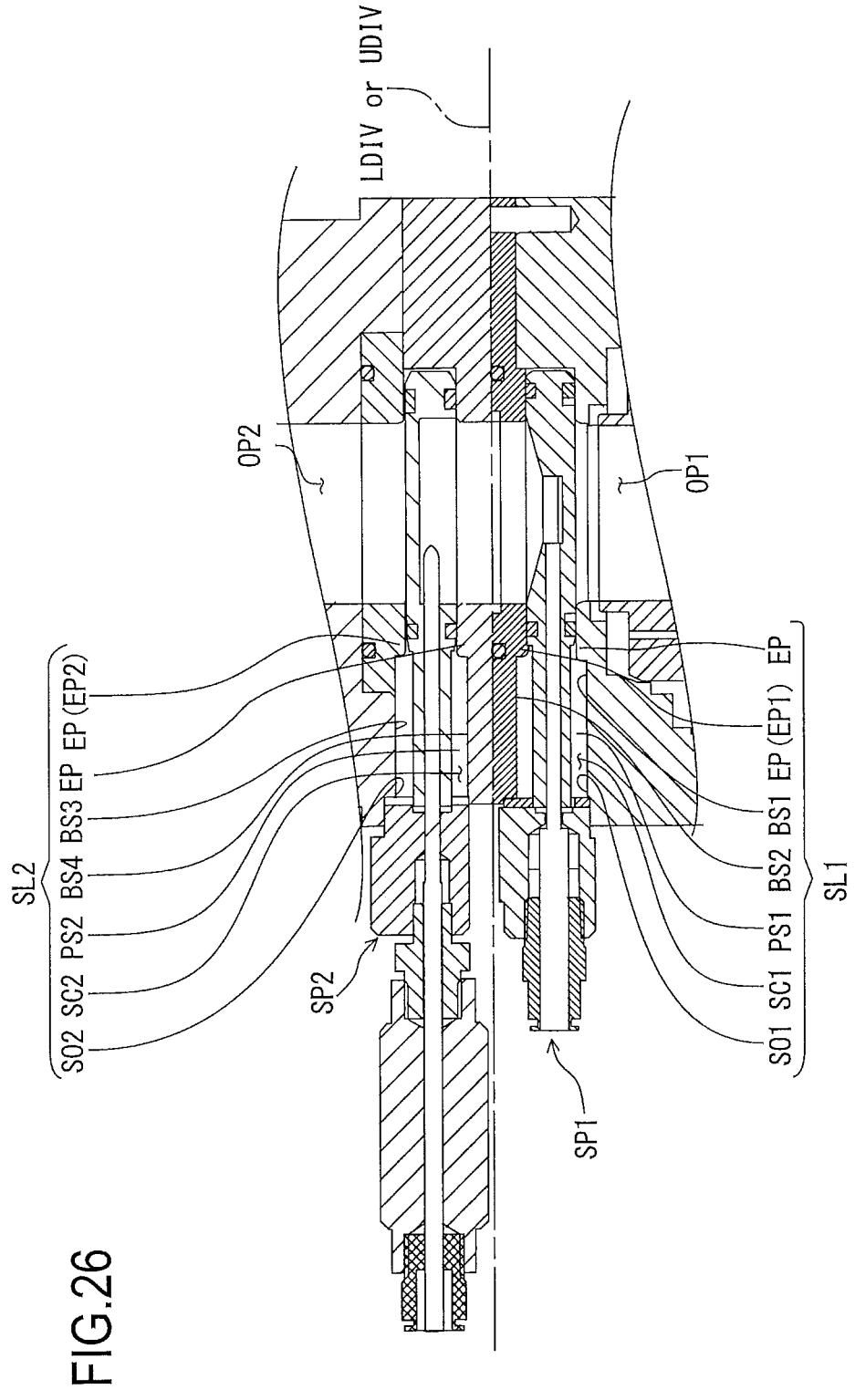
FIG. 26 illustrates a modification associated with the shapes of the first slot and the second slot.

The above embodiment illustrates an example in which at least one protrusion EP is provided at the second base surface BS2 and the third base surface BS3. Another possible configuration is that one or both of the first protrusion EP1 and the second protrusion EP2 is omitted, as illustrated in FIGS. 18, 19, and 20. Another possible configuration is that at least one protrusion EP is provided at the first base surface BS1 and the fourth base surface BS4, as illustrated in FIGS. 21, 22, and 23. Another possible configuration is that at least one protrusion EP is provided at both the first base surface BS1 and the second base surface BS2 and is provided at both the third base surface BS3 and the fourth base surface BS4, as illustrated in FIGS. 24, 25, and 26.

The laser working machine 1 may additionally include a sensor that distinguishes between the first light transmissive plate TP1 and the first shielding plate SP1 and distinguishes between the second light transmissive plate TP2 and the second shielding plate SP2. A possible configuration is that a protrusion is provided at the first light transmissive plate TP1 and the second light transmissive plate TP2 or at the first shielding plate SP1 and the second shielding plate SP2 so that the protrusion presses a switch when the plates are inserted into the first slot SL1 and the second slot SL2. Another possible configuration is that current flows upon insertion of the first light transmissive plate TP1 and the second light transmissive plate TP2 or the first shielding plate SP1 and the second shielding plate SP2.

Operations and Effects of the Embodiment

The laser working machine 1 according to the embodiment includes the first slot SL1 at the another end portion BP1AE of the first body BP1. In the first slot SL1, the first shielding plate SP1 and the first light transmissive plate TP1 are selectively insertable in a sealed manner. The first shielding plate SP1 is configured to block the first optical path OP1. The first light transmissive plate TP1 has the first optical path hole OH1, through which the first optical path OP1 and the second optical path OP2 are connectable to each other. The laser working machine 1 includes the second slot SL2 at the second body end portion BP2E of the second body BP2. In the second slot SL2, the second shielding plate SP2 and the second light transmissive plate TP2 are selectively insertable in a sealed manner. The second shielding plate SP2 is configured to block the second optical path OP2. The second light transmissive plate TP2 has the second optical path hole OH2, through which the first optical path OP1 and the second optical path OP2 are connectable to each other. This configuration prevents dust from entering not only the transmission optical path extending between the machining head 20 and the laser oscillator 17 but also the transmission optical path extending between the machining head 20 and the torch 24.

In the present application, the term "comprise" and its variations are intended to mean open-ended terms, not excluding any other elements and/or components that are not recited herein. The same applies to the terms "include", "have", and their variations.

Also in the present application, a component suffixed with a term such as "member", "portion", "part", "element", "body", and "structure" is intended to mean that there is a single such component or a plurality of such components.

Also in the present application, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

Also in the present application, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

Also in the present application, the phrase "at least one of A and B" is intended to be interpreted as "only A", "only B", or "both A and B".

Obviously, numerous modifications and variations of the present invention are possible in light of the above teachings. It is therefore to be understood that within the scope of the appended claims, the present invention may be practiced otherwise than as specifically described herein.

What is claimed is:

1. A laser working machine comprising:
a torch through which laser light is radiated to a workpiece;
a first body comprising:
one end portion on which the torch is mounted;
another end portion provided at a position opposite to the one end portion in a direction along a first optical path;
at least one mirror configured to reflect the laser light to guide the laser light to the torch along the first optical path; and
a first slot which is provided at the another end portion;
a second body comprising:
a second body end portion attachable and detachable to and from the another end portion of the first body;
a second optical path optically connected to the first optical path; and
a second slot which is provided at the second body end portion;
a first shielding plate insertable into the first slot in a sealed manner and configured to block and seal off a first passageway of the first body through which the first optical path passes; and
a second shielding plate insertable into the second slot in a sealed manner and configured to block and seal off a second passageway of the second body through which the second optical path passes,
wherein, when the first shielding plate is inserted into the first slot and the second shielding plate is inserted into the second slot, a space surrounded by the first shielding plate, the second shielding plate, the first body, and the second body is shielded.

2. The laser working machine according to claim 1, further comprising:
a first light transmissive plate insertable into the first slot in a sealed manner and having a first optical path hole through which the first optical path and the second optical path are connectable to each other; and
a second light transmissive plate insertable into the second slot in a sealed manner and having a second optical path hole through which the first optical path and the second optical path are connectable to each other.

3. The laser working machine according to claim 2,
wherein the another end portion of the first body has a first through hole defining the first optical path and extending in a first optical path extending direction,
wherein the second body end portion has a second through hole defining the second optical path and extending in a second optical path extending direction,
wherein the first slot is defined by:
a first base surface having an inner opening of the first through hole;
a second base surface that faces the first base surface in the first optical path extending direction and has a facing opening facing the inner opening of the first through hole in the first optical path extending direction; and a first outer circumferential surface extending in the first optical path extending direction between the first base surface and the second base surface, and wherein the second slot is defined by:

a third base surface having a first inner opening of the second through hole;

a fourth base surface that faces the third base surface in the second optical path extending direction and has a second inner opening of the second through hole facing the first inner opening of the second through hole in the second optical path extending direction; and a second outer circumferential surface extending in the second optical path extending direction between the third base surface and the fourth base surface.

4. The laser working machine according to claim 3, wherein the first light transmissive plate comprises a first attachment for mounting the first light transmissive plate on the another end portion of the first body, a first light transmissive plate body connected to the first attachment and having the first optical path hole, a first sealing member mounted on the first light transmissive plate body and surrounding an outer circumference of the first optical path hole as viewed from a first axial direction of a center axis of the first optical path hole to seal a gap between the first base surface and the first light transmissive plate body, a second sealing member mounted on the first light transmissive plate body and surrounding the outer circumference of the first optical path hole as viewed from the first axial direction to seal a gap between the second base surface and the first light transmissive plate body, and a first attachment sealing member mounted on the first attachment to seal a gap between a first slot opening and the first attachment, the first slot opening being an insertion hole through which the first shielding plate and the first light transmissive plate are inserted, and wherein the second light transmissive plate comprises a second attachment for mounting the second light transmissive plate on the second body end portion, a second light transmissive plate body connected to the second attachment and having the second optical path hole, a third sealing member mounted on the second light transmissive plate body and surrounding an outer circumference of the second optical path hole as viewed from a second axial direction of a center axis of the second optical path hole to seal a gap between the third base surface and the second light transmissive plate body, a fourth sealing member mounted on the second light transmissive plate body and surrounding the outer circumference of the second optical path hole as viewed from the second axial direction to seal a gap between the fourth base surface and the second light transmissive plate body, and a second attachment sealing member mounted on the second attachment to seal a gap between a second slot opening and the second attachment, the second slot opening being an insertion hole through which the second shielding plate and the second light transmissive plate are inserted.

5. The laser working machine according to claim 4, wherein the first shielding plate comprises a third attachment for mounting the first shielding plate on the another end portion of the first body, a first shielding plate body connected to the third attachment and comprising a first optical path shielding member that faces the inner opening of the first through hole in the first optical path extending direction to block the first optical path when the first shielding plate is inserted in the first slot, a fifth sealing member mounted on the first shielding plate body and surrounding the first optical path shielding member as viewed from a first thickness direction of the first shielding plate body to seal a gap between the first base surface and the first shielding plate body, and a sixth sealing member mounted on the first shielding plate body and surrounding the first optical path shielding member as viewed from the first thickness direction to seal a gap between the second base surface and the first shielding plate body, and wherein the second shielding plate comprises a fourth attachment for mounting the second shielding plate on the second body end portion, a second shielding plate body connected to the fourth attachment and comprising a second optical path shielding member that faces the first inner opening of the second through hole in the second optical path extending direction to block the second optical path when the second shielding plate is inserted in the second slot, a seventh sealing member mounted on the second shielding plate body and surrounding the second optical path shielding member as viewed from a second thickness direction of the second shielding plate body to seal a gap between the third base surface and the second shielding plate body, and an eighth sealing member mounted on the second shielding plate body and surrounding the second optical path shielding member as viewed from the second thickness direction to seal a gap between the fourth base surface and the second shielding plate body.

6. The laser working machine according to claim 3, wherein the first shielding plate comprises a third attachment for mounting the first shielding plate on the another end portion of the first body, a first shielding plate body connected to the third attachment and comprising a first optical path shielding member that faces the inner opening of the first through hole in the first optical path extending direction to block the first optical path when the first shielding plate is inserted in the first slot, a fifth sealing member mounted on the first shielding plate body and surrounding the first optical path shielding member as viewed from a first thickness direction of the first shielding plate body to seal a gap between the first base surface and the first shielding plate body, and a sixth sealing member mounted on the first shielding plate body and surrounding the first optical path shielding member as viewed from the first thickness direction to seal a gap between the second base surface and the first shielding plate body, and wherein the second shielding plate comprises a fourth attachment for mounting the second shielding plate on the second body end portion, a second shielding plate body connected to the fourth attachment and comprising a second optical path shielding member that faces the first inner opening of the second through hole in the second optical path extending direction to block the second optical path when the second shielding plate is inserted in the second slot, a seventh sealing member mounted on the second shielding plate body and surrounding the second optical path shielding member as viewed from a second thickness direction of the second shielding plate body to seal a gap between the third base surface and the second shielding plate body, and an eighth sealing member mounted on the second shielding plate body and surrounding the second optical path shielding member as viewed from the second thickness direction to seal a gap between the fourth base surface and the second shielding plate body.

7. The laser working machine according to claim 6, wherein one attachment that is out of the third attachment and the fourth attachment and that is provided at one shielding plate out of the first shielding plate and the second shielding plate has an external inlet through which gas is sent, wherein one shielding plate body that is out of the first shielding plate body and the second shielding plate body and that is provided at the one shielding plate has an internal outlet provided at a position opposite in one thickness direction to an optical path shielding member that the one shielding plate body has, the optical path shielding member of the one shielding plate body being out of the first optical path shielding member and the second optical path shielding member, the one thickness direction being a thickness direction of the one shielding plate body out of the first thickness direction and the second thickness direction, and a ventilating duct extending from the external inlet toward the internal outlet, wherein another attachment that is out of the third attachment and the fourth attachment and that is provided at another shielding plate out of the first shielding plate and the second shielding plate has an external outlet through which the gas is sent, and wherein another shielding plate body that is out of the first shielding plate body and the second shielding plate body and that is provided at the another shielding plate has an internal inlet provided at a position in another thickness direction opposite to an optical path shielding member that the another shielding plate body has, the optical path shielding member of the another shielding plate body being out of the first optical path shielding member and the second optical path shielding member, the another thickness direction being a thickness direction of the another shielding plate body out of the first thickness direction and the second thickness direction, and a discharge duct extending from the internal inlet toward the external outlet.

8. The laser working machine according to claim 7, wherein the another shielding plate body has a first depression provided at a position opposite to the optical path shielding member of the another shielding plate body in the thickness direction of the another shielding plate body, the first depression having an inverse truncated cone shape with the internal inlet serving as a bottom of the inverse truncated cone shape.

9. The laser working machine according to claim 7, wherein the one shielding plate body has a second depression provided at a position opposite to the optical path shielding member of the one shielding plate body in the thickness direction of the one shielding plate body, the second depression having a circular cylindrical shape, wherein the internal outlet is provided at a side surface of the circular cylindrical shape, and wherein an extension line of a center axis of the ventilating duct in the second depression is displaced from a center axis of the circular cylindrical shape.

10. The laser working machine according to claim 7, wherein the one shielding plate further comprises a filter connected to the external inlet to purify the gas, and wherein the another shielding plate further comprises a particle counter connected to the external outlet to measure an impurity contaminating the gas.

11. The laser working machine according to claim 7, wherein the second slot is provided above the first slot in a height direction of the laser working machine, and wherein the one shielding plate is the second shielding plate, and the another shielding plate is the first shielding plate.

12. The laser working machine according to claim 6, wherein the first shielding plate body has a first shielding plate back surface which comprises the first optical path shielding member and on which the fifth sealing member is mounted, a first shielding plate front surface on which the sixth sealing member is mounted, and a first shielding plate outer circumferential surface that connects the first shielding plate front surface and the first shielding plate back surface to each other and that is fitted with the first outer circumferential surface, and wherein the second shielding plate body has a second shielding plate front surface which comprises the second optical path shielding member and on which the seventh sealing member is mounted, a second shielding plate back surface on which the eighth sealing member is mounted, and a second shielding plate outer circumferential surface that connects the second shielding plate front surface and the second shielding plate back surface to each other and that is fitted with the second outer circumferential surface.

13. The laser working machine according to claim 6, wherein the first shielding plate further comprises a third attachment sealing member mounted on the third attachment to seal a gap between a first slot opening and the third attachment, the first slot opening being an insertion hole through which the first shielding plate and the first light transmissive plate are inserted, and wherein the second shielding plate further comprises a fourth attachment sealing member mounted on the fourth attachment to seal a gap between a second slot opening and the fourth attachment, the second slot opening being an insertion hole through which the second shielding plate and the second light transmissive plate are inserted.

14. The laser working machine according to claim 1, wherein the another end portion of the first body has a first through hole defining the first optical path and extending in a first optical path extending direction, wherein the second body end portion has a second through hole defining the second optical path and extending in a second optical path extending direction, wherein the first slot is defined by:

a first base surface having an inner opening of the first through hole;

a second base surface that faces the first base surface in the first optical path extending direction and has a facing opening facing the inner opening of the first through hole in the first optical path extending direction; and a first outer circumferential surface extending in the first optical path extending direction between the first base surface and the second base surface, and wherein the second slot is defined by:

a third base surface having a first inner opening of the second through hole;

a fourth base surface that faces the third base surface in the second optical path extending direction and has a second inner opening of the second through hole facing the first inner opening of the second through hole in the second optical path extending direction; and a second outer circumferential surface extending in the second optical path extending direction between the third base surface and the fourth base surface.

15. A laser working machine comprising:

a torch through which laser light is radiated to a workpiece;

a first body comprising:

one end portion on which the torch is mounted;

another end portion provided at a position opposite to the one end portion in a direction along a first optical path;

at least one mirror configured to reflect the laser light to guide the laser light to the torch along the first optical path; and a first slot which is provided at the another end portion;

a second body comprising:

a second body end portion attachable and detachable to and from the another end portion of the first body;

a second optical path optically connected to the first optical path; and a second slot which is provided at the second body end portion;

a first shielding plate insertable into the first slot in a sealed manner and configured to block the first optical path; and a second shielding plate insertable into the second slot in a sealed manner and configured to block the second optical path, wherein, when the first shielding plate is inserted into the first slot and the second shielding plate is inserted into the second slot, a space surrounded by the first shielding plate, the second shielding plate, the first body, and the second body is shielded, wherein one shielding plate out of the first shielding plate and the second shielding plate comprises a ventilating duct through which gas is sent to a shielded space surrounded by the first shielding plate, the second shielding plate, the first body, and the second body, and wherein another shielding plate out of the first shielding plate and the second shielding plate comprises a discharge duct through which the gas is discharged from the shielded space.

16. The laser working machine according to claim 15, further comprising:

a first light transmissive plate insertable into the first slot in a sealed manner and having a first optical path hole through which the first optical path and the second optical path are connectable to each other; and a second light transmissive plate insertable into the second slot in a sealed manner and having a second optical path hole through which the first optical path and the second optical path are connectable to each other, wherein the another end portion of the first body has a first through hole defining the first optical path and extending in a first optical path extending direction, wherein the second body end portion has a second through hole defining the second optical path and extending in a second optical path extending direction, wherein the first slot is defined by:

a first base surface having an inner opening of the first through hole;

a second base surface that faces the first base surface in the first optical path extending direction and has a facing opening facing the inner opening of the first through hole in the first optical path extending direction; and a first outer circumferential surface extending in the first optical path extending direction between the first base surface and the second base surface, and wherein the second slot is defined by:

a third base surface having a first inner opening of the second through hole;

a fourth base surface that faces the third base surface in the second optical path extending direction and has a second inner opening of the second through hole facing the first inner opening of the second through hole in the second optical path extending direction; and a second outer circumferential surface extending in the second optical path extending direction between the third base surface and the fourth base surface.

17. The laser working machine according to claim 16, wherein the first light transmissive plate comprises a first attachment for mounting the first light transmissive plate on the another end portion of the first body, a first light transmissive plate body connected to the first attachment and having the first optical path hole, a first sealing member mounted on the first light transmissive plate body and surrounding an outer circumference of the first optical path hole as viewed from a first axial direction of a center axis of the first optical path hole to seal a gap between the first base surface and the first light transmissive plate body, a second sealing member mounted on the first light transmissive plate body and surrounding the outer circumference of the first optical path hole as viewed from the first axial direction to seal a gap between the second base surface and the first light transmissive plate body, and a first attachment sealing member mounted on the first attachment to seal a gap between a first slot opening and the first attachment, the first slot opening being an insertion hole through which the first shielding plate and the first light transmissive plate are inserted, and wherein the second light transmissive plate comprises a second attachment for mounting the second light transmissive plate on the second body end portion, a second light transmissive plate body connected to the second attachment and having the second optical path hole, a third sealing member mounted on the second light transmissive plate body and surrounding an outer circumference of the second optical path hole as viewed from a second axial direction of a center axis of the second optical path hole to seal a gap between the third base surface and the second light transmissive plate body, a fourth sealing member mounted on the second light transmissive plate body and surrounding the outer circumference of the second optical path hole as viewed from the second axial direction to seal a gap between the fourth base surface and the second light transmissive plate body, and a second attachment sealing member mounted on the second attachment to seal a gap between a second slot opening and the second attachment, the second slot opening being an insertion hole through which the second shielding plate and the second light transmissive plate are inserted.

18. The laser working machine according to claim 17, wherein the first shielding plate comprises a third attachment for mounting the first shielding plate on the another end portion of the first body, a first shielding plate body connected to the third attachment and comprising a first optical path shielding member that faces the inner opening of the first through hole in the first optical path extending direction to block the first optical path when the first shielding plate is inserted in the first slot, a fifth sealing member mounted on the first shielding plate body and surrounding the first optical path shielding member as viewed from a first thickness direction of the first shielding plate body to seal a gap between the first base surface and the first shielding plate body, and a sixth sealing member mounted on the first shielding plate body and surrounding the first optical path shielding member as viewed from the first thickness direction to seal a gap between the second base surface and the first shielding plate body, and wherein the second shielding plate comprises a fourth attachment for mounting the second shielding plate on the second body end portion, a second shielding plate body connected to the fourth attachment and comprising a second optical path shielding member that faces the first inner opening of the second through hole in the second optical path extending direction to block the second optical path when the second shielding plate is inserted in the second slot, a seventh sealing member mounted on the second shielding plate body and surrounding the second optical path shielding member as viewed from a second thickness direction of the second shielding plate body to seal a gap between the third base surface and the second shielding plate body, and an eighth sealing member mounted on the second shielding plate body and surrounding the second optical path shielding member as viewed from the second thickness direction to seal a gap between the fourth base surface and the second shielding plate body.

19. The laser working machine according to claim 16, wherein the first shielding plate comprises a third attachment for mounting the first shielding plate on the another end portion of the first body, a first shielding plate body connected to the third attachment and comprising a first optical path shielding member that faces the inner opening of the first through hole in the first optical path extending direction to block the first optical path when the first shielding plate is inserted in the first slot, a fifth sealing member mounted on the first shielding plate body and surrounding the first optical path shielding member as viewed from a first thickness direction of the first shielding plate body to seal a gap between the first base surface and the first shielding plate body, and a sixth sealing member mounted on the first shielding plate body and surrounding the first optical path shielding member as viewed from the first thickness direction to seal a gap between the second base surface and the first shielding plate body, and wherein the second shielding plate comprises a fourth attachment for mounting the second shielding plate on the second body end portion, a second shielding plate body connected to the fourth attachment and comprising a second optical path shielding member that faces the first inner opening of the second through hole in the second optical path extending direction to block the second optical path when the second shielding plate is inserted in the second slot, a seventh sealing member mounted on the second shielding plate body and surrounding the second optical path shielding member as viewed from a second thickness direction of the second shielding plate body to seal a gap between the third base surface and the second shielding plate body, and an eighth sealing member mounted on the second shielding plate body and surrounding the second optical path shielding member as viewed from the second thickness direction to seal a gap between the fourth base surface and the second shielding plate body.

20. A method for maintaining a laser working machine, the method comprising:

providing the laser working machine comprising a first body having a first optical path along which laser light travels and a second body provided above the first body and having a second optical path along which the laser light travels;

removing a first light transmissive plate having a first optical path hole through which the first optical path is to pass in a state where the first light transmissive plate is inserted into a first slot of the first body and a second light transmissive plate is inserted into a second slot of the second body, the second light transmissive plate having a second optical path hole through which the second optical path is to pass;

inserting a first shielding plate into the first slot to block the first optical path;

removing the second light transmissive plate from the second slot;

inserting a second shielding plate into the second slot to block the second optical path;

separating the first body and the second body from each other for maintenance work performed on at least one of the first body and the second body;

connecting the first body and the second body to each other in a state where the first shielding plate is inserted into the first slot and the second shielding plate is inserted into the second slot;

sending gas through a ventilating duct of the second shielding plate to a shielded space defined between the first shielding plate and the second shielding plate to discharge the gas from the shielded space through a discharge duct of the first shielding plate;

removing the second shielding plate from the second slot;

inserting the second light transmissive plate into the second slot;

removing the first shielding plate from the first slot; and inserting the first light transmissive plate into the first slot.

* * * * *